United States Patent
Bui et al.

(10) Patent No.: US 11,097,988 B2
(45) Date of Patent: Aug. 24, 2021

(54) STRENGTH ENHANCING ADMIXTURE FOR CEMENTITIOUS COMPOSITIONS

(71) Applicant: Construction Research & Technology GmbH, Trostberg (DE)

(72) Inventors: Van Bui, Beachwood, OH (US); Steve Schaef, Beachwood, OH (US); Paul Horst Seiler, Beachwood, OH (US)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 16/467,724

(22) PCT Filed: Dec. 21, 2017

(86) PCT No.: PCT/EP2017/084046
§ 371 (c)(1),
(2) Date: Jun. 7, 2019

(87) PCT Pub. No.: WO2018/122091
PCT Pub. Date: Jul. 5, 2018

(65) Prior Publication Data
US 2019/0367422 A1    Dec. 5, 2019

Related U.S. Application Data

(60) Provisional application No. 62/439,278, filed on Dec. 27, 2016.

(51) Int. Cl.
| | | |
|---|---|---|
| *C04B 40/00* | (2006.01) | |
| *C04B 22/00* | (2006.01) | |
| *C04B 22/08* | (2006.01) | |
| *C04B 22/14* | (2006.01) | |
| *C04B 24/10* | (2006.01) | |
| *C04B 24/12* | (2006.01) | |
| *C04B 24/26* | (2006.01) | |
| *C04B 28/02* | (2006.01) | |
| *C04B 103/10* | (2006.01) | |
| *C04B 103/40* | (2006.01) | |
| *C04B 103/50* | (2006.01) | |

(52) U.S. Cl.
CPC ...... *C04B 40/0042* (2013.01); *C04B 22/0093* (2013.01); *C04B 22/085* (2013.01); *C04B 22/142* (2013.01); *C04B 24/10* (2013.01); *C04B 24/122* (2013.01); *C04B 24/2647* (2013.01); *C04B 28/02* (2013.01); *C04B 2103/10* (2013.01); *C04B 2103/408* (2013.01); *C04B 2103/50* (2013.01); *C04B 2201/50* (2013.01)

(58) Field of Classification Search
CPC ............ C04B 40/0042; C04B 22/0093; C04B 22/085; C04B 22/142; C04B 24/10; C04B 24/122; C04B 24/2647; C04B 28/02
See application file for complete search history.

(56) References Cited

U.S. PATENT DOCUMENTS

| | | |
|---|---|---|
| 2004/0149172 A1 | 8/2004 | Jardine et al. |
| 2004/0149174 A1 | 8/2004 | Farrington et al. |
| 2011/0269875 A1 | 11/2011 | Nicoleau et al. |
| 2015/0144032 A1* | 5/2015 | Brush ............... C04B 28/02 106/730 |
| 2015/0197448 A1 | 7/2015 | Nicoleau et al. |

FOREIGN PATENT DOCUMENTS

| | | |
|---|---|---|
| WO | WO 00/76936 A1 | 12/2000 |
| WO | WO 2010/026155 A1 | 3/2010 |
| WO | WO 2016/097181 A1 | 6/2016 |

OTHER PUBLICATIONS

International Search Report for corresponding PCT Patent Application No. PCT/EP2017/084046, dated Apr. 16, 2018.
International Written Opinion for corresponding PCT Patent Application No. PCT/EP2017/084046, dated Apr. 16, 2018.
International Preliminary Report on Patentability for corresponding PCT Patent Application No. PCT/EP2017/084046, dated Jul. 2, 2019.

* cited by examiner

*Primary Examiner* — John E Uselding
(74) *Attorney, Agent, or Firm* — Curatolo Sidoti Co., LPA; Salvatore A. Sidoti; Floyd Trillis, III

(57) ABSTRACT

A strength enhancing admixture for cementitious and/or pozzolanic compositions including, based on the total dry weight of the admixture, calcium silicate hydrate in an amount of from about 0.5 to about 94 weight percent, and: i) at least one alkanolamine in an amount of from about 0.5 to about 55 weight percent; ii) at least one inorganic accelerator in an amount of from about 0.5 to about 85 weight percent; and iii) at least one carbohydrate in an amount of from about 0.5 to about 50 weight percent; wherein the calcium silicate hydrate includes a product of a reaction of a water-soluble calcium compound with a water-soluble silicate compound in presence of a water-soluble dispersant; and wherein the at least one inorganic accelerator includes any inorganic accelerator(s) other than calcium silicate hydrate.

16 Claims, No Drawings

STRENGTH ENHANCING ADMIXTURE FOR CEMENTITIOUS COMPOSITIONS

This application is a national stage application of International Application No. PCT/EP2017/084046, filed 21 Dec. 2017, which claims priority from U.S. Provisional Patent Application Ser. No. 62/439,278, filed 27 Dec. 2016, which applications are incorporated herein by reference.

Admixtures for cementitious compositions are of widely varying formulations, and are designed to achieve many different purposes. Admixtures typically include materials which are incorporated into cementitious compositions in order to provide certain physical properties to the cementitious composition, such as increasing the strength of the composition once it begins to set, reducing the amount of water required for adequate workability of the composition, or altering the time required for the composition to set.

Provided is a strength enhancing admixture which provides acceptable and predictable workability while exhibiting desirable early and/or final compressive strengths to cementitious compositions. Early-stage strength may be determined within 2 to 24 hours after mixing with make-up water. Mid-stage strength may be determined within 2 to 7 days after mixing with make-up water. Final-stage strength may be determined within 20 to 90 days after mixing with make-up water. As used herein, "cementitious compositions" or "cementitious materials" refer to compositions and materials comprising cementitious and/or pozzolanic material.

In certain embodiments, the strength enhancing admixture is utilized in paste, grout, mortar and/or concrete applications. The terms paste, grout, mortar and concrete are terms of art in connection with hydraulic cementitious compositions, and refer to mixtures composed of an aqueous component, such as water, and a hydraulic cementitious material. Mortars and grouts are pastes that may additionally include fine aggregate, such as sand. Concretes are mortars that may additionally include coarse aggregate, such as gravel.

One significant advantage of the subject strength enhancing admixture is the ability to impart high early and/or final compressive strengths to cementitious compositions having a pozzolanic content, such as greater than about 10% by weight, based on the total dry weight of the cementitious composition. Such levels of pozzolanic content may retard strength development.

In one embodiment, the strength enhancing admixture comprises calcium silicate hydrate and at least one of: at least one alkanolamine; at least one inorganic accelerator; or at least one carbohydrate. As used herein, "calcium silicate hydrate" means at least one of calcium silicate hydrate or modified calcium silicate hydrate. Suitable calcium silicate hydrate or modified calcium silicate hydrates are disclosed, for example, in U.S. Pat. No. 8,653,186 B2, US 2015/0197448 A1 and WO 2016/097181 A1. A preferable modified calcium silicate hydrate is obtained by the reaction of a water-soluble calcium compound with a water-soluble silicate compound in presence of a water-soluble dispersant. Calcium silicate hydrate may contain foreign ions, such as magnesium and/or aluminum. Calcium silicate hydrate may be described with regard to its composition by the following empirical formula:

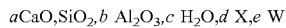

$a\text{CaO},\text{SiO}_2,b\ \text{Al}_2\text{O}_3,c\ \text{H}_2\text{O},d\ X,e\ W$ wherein:
X is an alkali metal;
W is an alkaline earth metal;
$0.1 \leq a \leq 2$, optionally $0.66 \leq a \leq 1.8$;
$0 \leq b \leq 1$, optionally $0 \leq b \leq 0.1$;
$1 \leq c \leq 6$, optionally $1 \leq c \leq 6.0$;
$0 \leq d \leq 1$, optionally $0 \leq d \leq 0.4$, further optionally $0 \leq d \leq 0.2$; and
$0 \leq e \leq 2$, optionally $0 \leq e \leq 0.1$.

Calcium silicate hydrate may be obtained by the reaction of a water-soluble calcium compound with a water-soluble silicate compound in presence of a water-soluble dispersant. In certain embodiments, the water-soluble dispersant may comprise a polycarboxylate ether (PCE) and/or a polyaryl ether. Suitable calcium silicate hydrate and its preparation are described, for example, in WO 2010/026155 A1.

In certain embodiments, the calcium silicate hydrate may comprise, in addition to silicate and calcium ions, further dissolved ions, such as aluminum salts and/or magnesium salts. Illustrative aluminum salts are aluminum halogens (such as aluminum chloride), aluminum nitrate, aluminum hydroxide and/or aluminum sulphate. Illustrative magnesium salts are magnesium nitrate, magnesium chloride and/or magnesium sulphate. The aluminum salts and/or magnesium salts may create defects in the calcium silicate hydrate via the introduction of ions other than calcium and silicon. This may lead to an improved hardening acceleration effect. In certain embodiments, the molar ratio of aluminum and/or magnesium to calcium and silicon is small. In certain embodiments, the molar ratios are selected in a way that in the previous empirical formula the following ranges for a, b and e are fulfilled: $0.66 \leq a \leq 1.8$; $0 \leq b \leq 0.1$; and $0 \leq e \leq 0.1$.

In a first step of an illustrative (non-limiting) process for preparing calcium silicate hydrate, a water-soluble calcium compound is mixed with an aqueous solution which contains a water-soluble dispersant (such as a comb polymer suitable as a plasticizer for hydraulic binders), so that a mixture preferably present as a solution is obtained, to which the water-soluble silicate compound is added in a subsequent second step. The water-soluble silicate compound of the second step may also contain the water-soluble dispersant. The aqueous solution may also contain one or more further solvents (for example alcohols like ethanol and/or isopropanol) in addition to water.

The temperature range in which the process may be carried out is not especially limited. However, certain limits may be imposed by the physical state of the system. It may be preferable to work in the range of 0 to 100° C., in certain embodiments 5 to 80° C. and in further embodiments 15 to 35° C. In certain embodiments, the process may be carried out at different pressures, such as in a range of 1 to 5 bars (100 to 500 kPa).

The pH-value of the reaction/product depends on the quantity of reactants (water-soluble calcium compound and water-soluble silicate) and on the solubility of the precipitated calcium silicate hydrate. In certain embodiments, the pH value is higher than 8 at the end of the synthesis, such as in a range between 8 and 13.5.

In certain embodiments, the calcium silicate hydrate may be prepared by reaction of a calcium compound, such as a calcium salt or a water-soluble calcium salt, with a silicon dioxide containing component under alkaline conditions, characterized in that the reaction is carried out in the presence of an aqueous solution of a water-soluble dispersant (such as a comb polymer suitable as a plasticizer for hydraulic binder).

As discussed above, suitable calcium silicate hydrates may be obtained by the reaction of a water-soluble calcium compound with a water-soluble silicate compound in presence of a water-soluble dispersant (such as a comb polymer suitable as a plasticizer for hydraulic binders). In certain embodiments, the water-soluble dispersant may comprise a polycarboxylate ether (PCE) and/or a polyaryl ether. The polycarboxylate ether may be or comprise a comb polymer suitable as a plasticizer for hydraulic binders, such as a water-soluble comb polymer suitable as a plasticizer for hydraulic binders.

In certain embodiments, the water-soluble comb polymer suitable as a plasticizer for hydraulic binders may be present as a copolymer which contains, on the main chain, side chains having ether functions and acid functions.

In certain embodiments, the water-soluble comb polymer suitable as a plasticizer for hydraulic binders may be present as a copolymer which is produced by free radical polymerization in the presence of acid monomer, preferably carboxylic acid monomer and polyether macromonomer, so that altogether at least 45 mol %, preferably at least 80 mol %, of all structural units of the copolymer are produced by incorporation of acid monomer, preferably carboxylic acid monomer and polyether macromonomer in the form of polymerized units. In certain embodiments, at least one structural unit is produced in the copolymer by incorporation of the acid monomer in the form of polymerized units, which at least one structural unit is in accordance with one of the general formulae (Ia), (Ib), (Ic) and/or (Id):

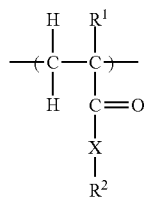
(Ia)

wherein:
$R^1$ are identical or different and are represented by H and/or a non-branched chain or branched $C_1$-$C_4$ alkyl group;
X are identical or different and are represented by NH—$(C_nH_{2n})$ where n=1, 2, 3 or 4 and/or O—$(C_nH_{2n})$ where n=1, 2, 3 or 4 and/or by a unit not present; and
$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

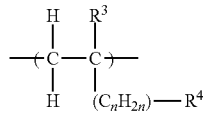
(Ib)

wherein:
$R^3$ are identical or different and are represented by H and/or a non-branched chain or a branched $C_1$-$C_4$ alkyl group;
n=0, 1, 2, 3 or 4; and
$R^4$ are identical or different and are represented by $SO_3H$, $PO_3H_2$, O—$PO_3H_2$ and/or para-substituted $C_6H_4$—$SO_3H$;

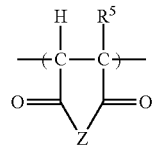
(Ic)

wherein:
$R^5$ are identical or different and are represented by H and/or a non-branched chain or a branched $C_1$-$C_4$ alkyl group; and
Z are identical or different and are represented by O and/or NH;

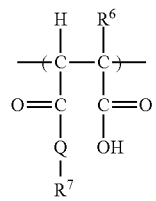
(Id)

wherein:
$R^6$ are identical or different and are represented by H and/or a non-branched chain or branched $C_1$-$C_4$ alkyl group;
Q are identical or different and are represented by NH and/or O; and
$R^7$ are identical or different and are represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-$(A'O)_\alpha$—$R^9$ where m=0, 1, 2, 3 or 4, e=0, 1, 2, 3 or 4, A'=$C_xH_{2x'}$ where x'=2, 3, 4 or 5 and/or $CH_2C(C_6H_5)H$—, α=an integer from 1 to 350 where $R^9$ are identical or different and are represented by a non-branched chain or a branched $C_1$-$C_4$ alkyl group.

In certain embodiments, at least one structural unit is produced in the copolymer by incorporation of the polyether macromonomer in the form of polymerized units, which at least one structural unit is in accordance with one of the general formulae (IIa), (IIb) and/or (IIc):

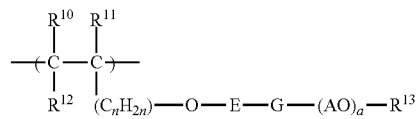
(IIa)

wherein:
$R^{10}$, $R^{11}$ and $R^{12}$ are in each case identical or different and, independently of one another, are represented by H and/or a non-branched chain or a branched $C_1$-$C_4$ alkyl group; E are identical or different and are represented by a non-branched chain or branched $C_1$-$C_6$ alkylene group, a cyclohexylen group, $CH_2$—$C_6H_{10}$, ortho-, meta- or para-substituted $C_6H_4$ and/or a unit not present;
G are identical or different and are represented by O, NH and/or CO—NH, with the proviso that, if E is a unit not present, G is also present as a unit not present;

A are identical or different and are represented by $C_xH_{2x}$ where x=2, 3, 4 and/or 5 (preferably x=2) and/or $CH_2CH(C_6H_5)$;

n are identical or different and are represented by 0, 1, 2, 3, 4 and/or 5;

a are identical or different and are represented by an integer from 2 to 350 (preferably 10-200); and $R^{13}$ are identical or different and are represented by H, a non-branched chain or a branched $C_1$-$C_4$ alkyl group, CO—$NH_2$, and/or $COCH_3$;

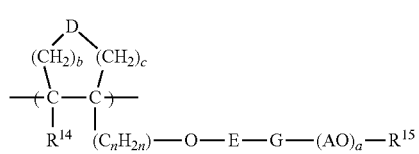

(IIb)

wherein:

$R^{14}$ are identical or different and are represented by H and/or a non-branched chain or branched $C_1$-$C_4$ alkyl group;

E are identical or different and are represented by a non-branched chain or branched $C_1$-$C_6$ alkylene group, a cyclohexylen group, $CH_2$—$C_6H_{10}$, ortho-, meta- or para-substituted $C_6H_4$ and/or by a unit not present;

G are identical or different and are represented by a unit not present, O, NH and/or CO—NH, with the proviso that, if E is a unit not present, G is also present as a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5;

a are identical or different and are represented by an integer from 2 to 350;

D are identical or different and are represented by a unit not present, NH and/or O, with the proviso that, if D is a unit not present: b=0, 1, 2, 3 or 4 and c=0, 1, 2, 3 or 4, where b+c=3 or 4, and with the proviso that if D is NH and/or O: b=0, 1, 2 or 3, c=0, 1, 2 or 3, where b+c=2 or 3; and $R^{15}$ are identical or different and are represented by H, a non-branched chain or branched $C_1$-$C_4$ alkyl group, CO—$NH_2$, and/or $COCH_3$;

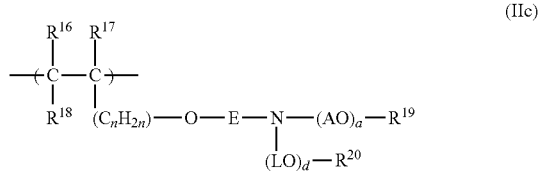

(IIc)

wherein:

$R^{16}$, $R^{17}$ and $R^{18}$ are in each case identical or different and, independently of one another, are represented by H and/or a non-branched chain or branched $C_1$-$C_4$ alkyl group;

E are identical or different and are represented by a non-branched chain or branched $C_1$-$C_6$ alkylene group, a cyclohexylen group, $CH_2$—$C_6H_{10}$, ortho-, meta- or para-substituted $C_6H_4$ and/or a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5;

L are identical or different and are represented by $C_xH_{2x}$ where x=2, 3, 4 and/or 5 and/or $CH_2$—$CH(C_6H_5)$;

a are identical or different and are represented by an integer from 2 to 350;

d are identical or different and are represented by an integer from 1 to 350;

$R^{19}$ are identical or different and are represented by H and/or a non-branched chain or a branched $C_1$-$C_4$ alkyl group; and $R^{20}$ are identical or different and are represented by H and/or a non-branched chain $C_1$-$C_4$ alkyl group.

In certain embodiments, at least one structural unit is produced in the copolymer by incorporation of the polyether macromonomer in the form of polymerized units, which at least one structural unit is in accordance with the general formula (IId):

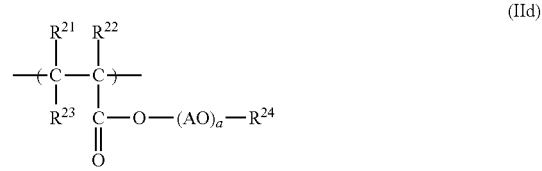

(IId)

wherein:

$R^{21}$, $R^{22}$ and $R^{23}$ are in each case identical or different and, independently of one another, are represented by H and/or a non-branched chain or branched $C_1$-$C_4$ alkyl group;

A are identical or different and are represented by $C_xH_{2x}$ where x=2, 3, 4 and/or 5 and/or $CH_2CH(C_6H_5)$;

a are identical or different and are represented by an integer from 2 to 350;

$R^{24}$ are identical or different and are represented by H and/or a non-branched chain or a branched $C_1$-$C_4$ alkyl group, preferably a $C_1$-$C_4$ alkyl group.

In certain embodiments, the polyaryl ether may comprise at least one polycondensate containing: (I) at least one structural unit consisting of an aromatic or heteroaromatic moiety bearing a polyether side chain; and (II) at least one structural unit consisting of an aromatic or heteroaromatic moiety bearing at least one phosphoric acid ester group and/or its salt. In certain embodiments, the polycondensate may be present in the aqueous solution which contains the water-soluble comb polymer suitable as a plasticizer for hydraulic binders.

In certain embodiments, the structural unit (I) may be represented by the following general formula:

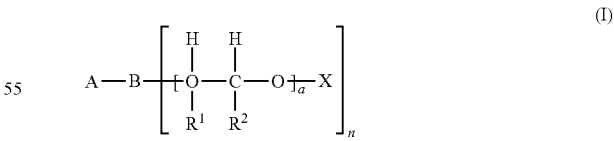

(I)

wherein:

A are identical or different and are represented by a substituted or unsubstituted aromatic or heteroaromatic compound having 5 to 10 C atoms;

B are identical or different and are represented by N, NH or O;

n is 2 if B is N and n is 1 if B is NH or O;

$R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H;

a are identical or different and are represented by an integer from 1 to 300; and X are identical or different and are represented by a branched or straight-chain $C_1$- to $C_{10}$-alkyl radical, $C_5$- to $C_8$-cycloalkyl radical, aryl radical, heteroaryl radical or H.

In certain embodiments, the structural unit (II) may be represented by the following general formula:

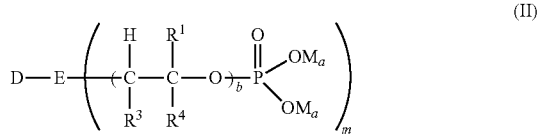

wherein:

D are identical or different and are represented by a substituted or unsubstituted heteroaromatic compound having 5 to 10 C atoms;

E are identical or different and are represented by N, NH or O;

m is 2 if E is N and m is 1 if E is NH or O;

$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H;

b are identical or different and are represented by an integer from 1 to 300;

M is independently of one another an alkaline metal ion, alkaline earth metal ion, ammonium ion, organic ammonium ion and/or H; and a is 1 or in the case of alkaline earth metal ions 1/2.

In certain embodiments, the molar ratio of the structural units (I):(II) is 1:10 to 10:1.

In certain embodiments, the polycondensate may contain at least one further structural unit (III) which is represented by the following general formula:

wherein:

Y, independently of one another, are identical or different and are represented by (I), (II), or further constituents of the polycondensate;

$R^5$ are identical or different and are represented by H, $CH_3$, COOH or a substituted or unsubstituted aromatic or heteroaromatic compound having 5 to 10 C atoms; and $R^6$ are identical or different and are represented by H, $CH_3$, COOH or a substituted or unsubstituted aromatic or heteroaromatic compound having 5 to 10 C atoms.

In certain embodiments of general formula (III), $R^5$ and $R^6$, independently of one another, are identical or different and are represented by H, COOH and/or methyl.

In certain embodiments, the molar ratio of the structural units [(I)+(II)]:(III) is 1:0.8 to 3 in the polycondensate.

In certain embodiments, the calcium silicate hydrate is not a product of a reaction including a hydraulic cement, such as Portland cement.

The analysis of calcium silicate hydrate is possible, for example, by X-ray diffraction (XRD), as the calcium silicate hydrate phase of the product is characterized by typical XRD reflexes in the diffraction pattern. Depending on the formed calcium silicate hydrate phase the peaks vary according to Saito, F.; Mi, G., Hanada, M.: Mechanochemical synthesis of hydrated calcium silicates by room temperature grinding, Solid State Ionics, 1997, 101-103, pp. 37-43. Typical reflexes are at d-values of 11-14 Å, 5.0-5.6 Å, 3.0-3.1 Å, and 2.76-2.83 Å according to a mixture of different calcium silicate hydrate phases like tobermorite and xonotlite with a crystallite size smaller than 20 nm. Measurement of the calcium silicate hydrate particle diameter may be done at a temperature of 25° C. via the analytical ultracentrifuge Beckman Model Optima XLI from Beckman Coulter GmbH. The analytical method of ultracentrifugation was chosen because methods like light scattering may not be suitable for the particularly small particles of this invention (particularly for diameters below about 100 nm).

In some embodiments, the strength enhancing admixture comprises, based on the total dry weight of the admixture, calcium silicate hydrate in an amount of greater than 0 to about 95 weight percent and at least one of: i) at least one alkanolamine in an amount of greater than 0 to about 95 weight percent; ii) at least one inorganic accelerator in an amount of greater than 0 to about 95 weight percent; or iii) at least one carbohydrate in an amount of greater than 0 to about 95 weight percent. As used herein, the phrase "dry weight" means the weight of a substance, not including any free water present in the substance.

The dry weight of a substance may be determined by commonly-used oven-drying techniques, such as drying a substance in an oven at 105° C. for a period of time sufficient to remove free water (e.g., about 17 hours).

Alternatively, the amount of water in a substance may be determined by Karl Fischer titration methods which are known to those of skill in the art, assuming that no interfering substances are present. The dry weight would then be calculated based on the total weight of the substance minus the amount of water determined to be present according to these methods.

Furthermore, the amount of a specific compound present in a substance may be determined by experimentation tailored to determine the amount of the specific compound. Many such methods are known in the art, tailored to many specific compounds. Using such tailored experiments will enable determinations as to the amount of the specific compound present in the overall substance, indicating the "dry weight" of the specific compound as a proportion of the total weight of the overall substance. By pairing such a determination with a determination of the total dry weight of the overall substance found via a Karl Fischer method, the "dry weight" of the specific compound may be determined, and reported as a percentage of the total dry weight of the overall substance.

However, the dry weight of calcium silicate hydrate may include chemically bound water. The bound water content of the calcium silicate hydrate may be determined by drying to constant weight at high temperatures in a drying oven, with the weight difference found being regarded as the proportion of bound water. The term "high temperatures" within this disclosure is utilized to indicate heating to temperatures of at least 100° C. and above, such as temperatures of around 200° C. When calcium silicate hydrate is exposed to high temperatures, chemically and physically bound water molecules are released.

In some embodiments, the strength enhancing admixture comprises, based on the total dry weight percent of the admixture, calcium silicate hydrate in an amount of from about 0.5 to about 94 weight percent and at least one of: i) at least one alkanolamine in an amount of greater than 0 to about 55 weight percent; ii) at least one inorganic accelerator in an amount of greater than 0 to about 85 weight percent; or iii) at least one carbohydrate in an amount of greater than 0 to about 50 weight percent.

In some embodiments, the strength enhancing admixture comprises, based on the total dry weight percent of the admixture, calcium silicate hydrate in an amount of from about 1 to about 80 weight percent and at least one of: i) at least one alkanolamine in an amount of from about 1 to about 40 weight percent; ii) at least one inorganic accelerator in an amount of from about 1 to about 70 weight percent; or iii) at least one carbohydrate in an amount of from about 1 to about 40 weight percent.

In some embodiments, the strength enhancing admixture comprises, based on the total dry weight percent of the admixture, calcium silicate hydrate in an amount of from about 2.5 to about 70 weight percent and at least one of: i) at least one alkanolamine in an amount of from about 2.5 to about 30 weight percent; ii) at least one inorganic accelerator in an amount of from about 2.5 to about 50 weight percent; or iii) at least one carbohydrate in an amount of from about 2.5 to about 30 weight percent.

In some embodiments, the strength enhancing admixture comprises, based on the total dry weight percent of the admixture, calcium silicate hydrate in an amount of from about 2.5 to about 50 weight percent and at least one of: i) at least one alkanolamine in an amount of from about 2.5 to about 30 weight percent; ii) at least one inorganic accelerator in an amount of from about 2.5 to about 40 weight percent; or iii) at least one carbohydrate in an amount of from about 2.5 to about 30 weight percent.

In some embodiment, the strength enhancing admixture comprises, based on the total dry weight percent of the admixture, calcium silicate hydrate in an amount of from about 5 to about 70 weight percent and at least one of: i) at least one alkanolamine in an amount of from about 5 to about 30 weight percent; ii) at least one inorganic accelerator in an amount of from about 5 to about 50 weight percent; or iii) at least one carbohydrate in an amount of from about 5 to about 30 weight percent.

In some embodiments, the strength enhancing admixture comprises, based on the total dry weight percent of the admixture, calcium silicate hydrate in an amount of from about 7.5 to about 50 weight percent and at least one of: i) at least one alkanolamine in an amount of from about 7.5 to about 30 weight percent; ii) at least one inorganic accelerator in an amount of from about 7.5 to about 50 weight percent; or iii) at least one carbohydrate in an amount of from about 7.5 to about 30 weight percent.

In some embodiments, the strength enhancing admixture comprises, based on the total dry weight percent of the admixture, calcium silicate hydrate in an amount of from about 7.5 to about 40 weight percent and at least one of: i) at least one alkanolamine in an amount of from about 7.5 to about 20 weight percent; ii) at least one inorganic accelerator in an amount of from about 7.5 to about 40 weight percent; or iii) at least one carbohydrate in an amount of from about 7.5 to about 20 weight percent.

In some embodiments, the strength enhancing admixture comprises, based on the total dry weight percent of the admixture, calcium silicate hydrate in an amount of from about 10 to about 50 weight percent and at least one of: i) at least one alkanolamine in an amount of from about 10 to about 30 weight percent; ii) at least one inorganic accelerator in an amount of from about 10 to about 50 weight percent; or iii) at least one carbohydrate in an amount of from about 10 to about 30 weight percent.

In some embodiments, the strength enhancing admixture comprises, based on the total dry weight percent of the admixture, calcium silicate hydrate in an amount of from about 10 to about 40 weight percent and at least one of: i) at least one alkanolamine in an amount of from about 10 to about 20 weight percent; ii) at least one inorganic accelerator in an amount of from about 10 to about 40 weight percent; or iii) at least one carbohydrate in an amount of from about 10 to about 20 weight percent.

In some embodiments, the strength enhancing admixture comprises, based on the total dry weight percent of the admixture, calcium silicate hydrate in an amount of from about 10 to about 30 weight percent and at least one of: i) at least one alkanolamine in an amount of from about 10 to about 20 weight percent; ii) at least one inorganic accelerator in an amount of from about 10 to about 40 weight percent; or iii) at least one carbohydrate in an amount of from about 10 to about 20 weight percent.

In some embodiments, the strength enhancing admixture comprises, based on the total dry weight percent of the admixture, calcium silicate hydrate in an amount of from about 10 to about 20 weight percent and at least one of: i) at least one alkanolamine in an amount of from about 10 to about 20 weight percent; ii) at least one inorganic accelerator in an amount of from about 10 to about 40 weight percent; or iii) at least one carbohydrate in an amount of from about 10 to about 20 weight percent.

In some embodiments, the strength enhancing admixture comprises, based on the total dry weight percent of the admixture, calcium silicate hydrate in an amount of from about 10 to about 15 weight percent and at least one of: i) at least one alkanolamine in an amount of from about 10 to about 20 weight percent; ii) at least one inorganic accelerator in an amount of from about 10 to about 40 weight percent; or iii) at least one carbohydrate in an amount of from about 10 to about 20 weight percent.

In some embodiments, the strength enhancing admixture comprises, based on the total dry weight percent of the admixture, calcium silicate hydrate in an amount of from about 2.5 to about 10 weight percent and at least one of: i) at least one alkanolamine in an amount of from about 10 to about 20 weight percent; ii) at least one inorganic accelerator in an amount of from about 10 to about 40 weight percent; or iii) at least one carbohydrate in an amount of from about 10 to about 20 weight percent.

In some embodiments, the strength enhancing admixture comprises, based on the total dry weight percent of the admixture, calcium silicate hydrate in an amount of from about 2.5 to about 7.5 weight percent and at least one of: i) at least one alkanolamine in an amount of from about 10 to about 20 weight percent; ii) at least one inorganic accelerator in an amount of from about 10 to about 40 weight percent; or iii) at least one carbohydrate in an amount of from about 10 to about 20 weight percent.

It should be understood that when a range of values is described in the present disclosure, it is intended that any and every value within the range, including the end points, is to be considered as having been stated. For example, a range of "from 1 to 10" is to be read as indicating each and every possible number along the continuum between 1 and 10. It is to be understood that the inventors appreciate and understand that any and all values within the range are to be considered to have been specified, and that the inventors have possession of the entire range and all values within the range.

In the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" a recited value produces the desired degree of effectiveness in the compositions and/or methods of the present disclosure. One of skill in the art would further understand that the metes and bounds of "about" with respect to the value of a percentage, amount or quantity of any component in an embodiment can be determined by varying the value, determining the effectiveness of the composition for each value, and determining the range of values that produce compositions with the desired degree of effectiveness in accordance with the present disclosure. The term "about" may further be used to reflect the possibility that a composition may contain trace components of other materials that do not alter the effectiveness or safety of the composition.

In the present disclosure, the term "substantially" refers to a degree of deviation that is sufficiently small so as to not measurably detract from the identified property or circumstance. The exact degree of deviation allowable may in some cases depend on the specific context.

The compositional weight percentages disclosed herein are based on the total weight of the dry admixture. It will be understood to one of ordinary skill in the art that the total dry weight percent of the admixture cannot exceed 100%. For example, a person of ordinary skill in the art would easily recognize and understand that an admixture composition comprising calcium silicate hydrate in an amount of from about 0.5 to about 94 weight percent and at least one of: i) at least one alkanolamine in an amount of greater than 0 to about 55 weight percent; ii) at least one inorganic accelerator in an amount of greater than 0 to about 85 weight percent; or iii) at least one carbohydrate in an amount of greater than 0 to about 50 weight percent, will not exceed 100%. A person of ordinary skill in the art would understand that the amount of calcium silicate hydrate and at least one of: i) at least one alkanolamine; ii) at least one inorganic accelerator; or iii) at least one carbohydrate will be adjusted to include the desired amount of components without exceeding 100% by weight of the dry admixture.

In some embodiments, the calcium silicate hydrate has an average particle size less than about 1,000 nm. In further embodiments, the calcium silicate hydrate has an average particle size less than about 500 nm. In yet further embodiments, the calcium silicate hydrate has an average particle size less than about 250 nm. In yet further embodiments, the calcium silicate hydrate has an average particle size less than about 200 nm. In yet further embodiments, the calcium silicate hydrate has an average particle size less than about 150 nm. In yet further embodiments, the calcium silicate hydrate has an average particle size less than about 100 nm. In yet further embodiments, the calcium silicate hydrate has an average particle size less than about 50 nm. In yet further embodiments, the calcium silicate hydrate has an average particle size less than about 30 nm. In yet further embodiments, the calcium silicate hydrate has an average particle size less than about 0.1 nm. In yet further embodiments, the calcium silicate hydrate has an average particle size less than about 0.05 nm. In yet further embodiments, the calcium silicate hydrate has an average particle size less than about 0.03 nm. The particle size of calcium silicate hydrate may be measured by using laser light diffraction with an instrument such as MasterSizer® 2000, commercially available from Malvern Instruments Ltd, United Kingdom.

In some embodiments, the at least one alkanolamine comprises at least one of triisopropanolamine ("TIPA"), triethanolamine ("TEA"), N,N,N',N'-tetra(hydroxyethyl)ethylenediamine ("THEED"), monoethano lamine ("MEA"), methydiethanolamine ("MDEA"), diethanolamine ("DEA") or diisopropanolamine ("DIPA").

In some embodiments, the at least one inorganic accelerator comprises at least one of a thiocyanate-based compound, a sulfate-based compound, an aluminate-based compound, a nitrate-based compound, a nitrite-based compound, or colloidal silica. A suitable colloidal silica is commercially available from BASF Corporation under the trademark MasterRoc® MS 675. In certain embodiments, the at least one inorganic accelerator does not comprise or include calcium silicate hydrate. In certain embodiments, the at least one inorganic accelerator may comprise any inorganic accelerator(s) other than calcium silicate hydrate.

In some embodiments, the thiocyanate-based compound comprises at least one of an alkali metal thiocyanate, an alkaline earth metal thiocyanate, or an ammonium thiocyanate.

In certain embodiments, the thiocyanate-based compound comprises at least one of sodium thiocyanate, calcium thiocyanate or magnesium thiocyanate.

In some embodiments, the sulfate-based compound comprises at least one of aluminum sulfate, aluminum hydroxy sulfate, calcium thiosulfate, sodium thiosulfate, potassium sulfate, calcium sulfate, calcium sulfate hemihydrate, calcium sulfate hemihydrate dehydrate, or sodium sulfate.

In some embodiments, the aluminate-based compound comprises sodium aluminate.

In some embodiments, the nitrate-based compound comprises at least one nitrate salt of at least one of an alkali metal, an alkaline earth metal or aluminum. In some embodiments, the nitrate-based compound comprises at least one of calcium nitrate or sodium nitrate.

In some embodiments, the nitrite-based compound comprises at least one nitrite salt of at least one of an alkali metal, an alkaline earth metal, or aluminum. In some embodiments, the nitrite-based compound comprises at least one of calcium nitrite or sodium nitrite.

In some embodiments, the carbohydrate comprises at least one of at least one sugar-containing material, corn syrup, diutan gum, welan gum, molasses, or sucrose. In some embodiments, the carbohydrate comprises at least one sugar-containing material, preferably at least one of corn syrup, duitan gum, welan gum, molasses or sucrose. In some embodiments, the carbohydrate comprises caramel color. Suitable sugar-containing materials include monosaccharides and oligosaccharides, such as disaccharides and trisaccharides. Examples of suitable sugar-containing materials include sucrose, glucose, fructose, maltose, mannose, galactose, lactose and raffinose. Suitable molasses include cane molasses, beet molasses, broomcorn molasses, desugared molasses and blackstrap molasses. Other sugar-containing materials include, but are not limited to, honey and corn syrup. It is understood that the composition and properties of sugar-containing materials and their derivatives may vary slightly according to crop types, sources and processing conditions.

The sugar-containing materials may be naturally obtained, or be produced via one or more steps of physical process, chemical process and/or biochemical process. Suitable corn syrups include ADM 42/43 corn syrup from Archer Daniels Midland Company, and Clearsweet® 43/43 corn syrup from Cargill Inc. It is understood that sugar-containing materials are natural materials or based on natural materials, and may therefore contain water, some organic or inorganic substances, for example organic acids, ketones, alcohols, salts, metal ions, ash, and so forth, as well as sugar.

In some embodiments, the strength enhancing admixture comprises a solid composition. In other embodiments, the strength enhancing admixture comprises a liquid suspension or solution.

In certain embodiments, the total amount of calcium silicate hydrate and at least one of: i) at least one alkanolamine; ii) at least one inorganic accelerator; or iii) at least one carbohydrate may not be less than 2.5% by weight of the admixture. In further embodiments, the total amount of calcium silicate hydrate and at least one of: i) at least one alkanolamine; ii) at least one inorganic accelerator; or iii) at least one carbohydrate may not be less than 5% by weight of the admixture. In further embodiments, the total amount of calcium silicate hydrate and at least one of: i) at least one alkanolamine; ii) at least one inorganic accelerator; or iii) at least one carbohydrate may not be less than 7.5% by weight of the admixture. In further embodiments, the total amount of calcium silicate hydrate and at least one of: i) at least one alkanolamine; ii) at least one inorganic accelerator; or iii) at least one carbohydrate may not be less than 10% by weight of the admixture. In these embodiments, the remaining content of the admixture may comprise water and/or any other components of the admixture as described herein.

In some embodiments, the strength enhancing admixture is capable of providing a cementitious composition with at least about a 2.5% increase in compressive strength within 1-day after placement, as compared to cementitious compositions that do not include the strength enhancing admixture.

In some embodiments, the strength enhancing admixture is capable of providing the cementitious compositions with at least about a 2.5% increase in compressive strength within 7-days after placement, as compared to cementitious compositions that do not include the strength enhancing admixture.

In some embodiments, the strength enhancing admixture is capable of providing the cementitious compositions with at least about a 2.5% increase in compressive strength within 28-days after placement, as compared to cementitious compositions that do not include the strength enhancing admixture.

In some embodiments, the strength enhancing admixture is capable of providing the cementitious compositions with at least about a 5% increase in compressive strength within 1-day after placement, as compared to cementitious compositions that do not include the strength enhancing admixture.

In some embodiments, the strength enhancing admixture is capable of providing the cementitious compositions with at least about a 5% increase in compressive strength within 7-days after placement, as compared to cementitious compositions that do not include the strength enhancing admixture.

In some embodiments, the strength enhancing admixture is capable of providing the cementitious compositions with at least about a 5% increase in compressive strength within 28-days after placement, as compared to cementitious compositions that do not include the strength enhancing admixture.

In some embodiments, the strength enhancing admixture is capable of providing the cementitious compositions with at least about a 7.5% increase in compressive strength within 1-day after placement, as compared to cementitious compositions that do not include the strength enhancing admixture.

In some embodiments, the strength enhancing admixture is capable of providing the cementitious compositions with at least about a 7.5% increase in compressive strength within 7-days after placement, as compared to cementitious compositions that do not include the strength enhancing admixture.

In some embodiments, the strength enhancing admixture is capable of providing the cementitious compositions with at least about a 7.5% increase in compressive strength within 28-days after placement, as compared to cementitious compositions that do not include the strength enhancing admixture.

In some embodiments, the strength enhancing admixture is capable of providing the cementitious compositions with at least about a 10% increase in compressive strength within 1-day after placement, as compared to cementitious compositions that do not include the strength enhancing admixture.

In some embodiments, the strength enhancing admixture is capable of providing the cementitious compositions with at least about a 10% increase in compressive strength within 7-days after placement, as compared to cementitious compositions that do not include the strength enhancing admixture.

In some embodiments, the strength enhancing admixture is capable of providing the cementitious compositions with at least about a 10% increase in compressive strength within 28-days after placement, as compared to cementitious compositions that do not include the strength enhancing admixture.

In some embodiments, the strength enhancing admixture is capable of providing the cementitious compositions with at least about a 15% increase in compressive strength within 1-day after placement, as compared to cementitious compositions that do not include the strength enhancing admixture.

In some embodiments, the strength enhancing admixture is capable of providing the cementitious compositions with at least about a 15% increase in compressive strength within 7-days after placement, as compared to cementitious compositions that do not include the strength enhancing admixture.

In some embodiments, the strength enhancing admixture is capable of providing the cementitious compositions with at least about a 15% increase in compressive strength within 28-days after placement, as compared to cementitious compositions that do not include the strength enhancing admixture.

In some embodiments, the strength enhancing admixture is capable of providing the cementitious compositions with at least about a 20% increase in compressive strength within 1-day after placement, as compared to cementitious compositions that do not include the strength enhancing admixture.

In some embodiments, the strength enhancing admixture is capable of providing the cementitious compositions with at least about a 20% increase in compressive strength within 7-days after placement, as compared to cementitious compositions that do not include the strength enhancing admixture.

In some embodiments, the strength enhancing admixture is capable of providing the cementitious compositions with at least about a 20% increase in compressive strength within 28-days after placement, as compared to cementitious compositions that do not include the strength enhancing admixture.

Also provided is a cementitious composition comprising a strength enhancing admixture comprising calcium silicate hydrate and at least one of: i) at least one alkanolamine; ii) at least one inorganic accelerator; or iii) at least one carbohydrate.

In some embodiments, the strength enhancing admixture is present in a cementitious composition in an amount of greater than 0 to about 250 oz/cwt (greater than 0 to about 16 L/100 kg). Oz/cwt can be converted to mL/100 kg by multiplying by 65.19. In further embodiments, the strength enhancing admixture is present in an amount of greater than 0 to about 200 oz/cwt (greater than 0 to about 13 L/100 kg). In further embodiments, the strength enhancing admixture is present in an amount of greater than 0 to about 150 oz/cwt (greater than 0 to about 10 L/100 kg). In further embodiments, the strength enhancing admixture is present in an amount of greater than 0 to about 100 oz/cwt (greater than 0 to about 7 L/100 kg). In further embodiments, the strength enhancing admixture is present in an amount of greater than 0 to about 75 oz/cwt (greater than 0 to about 4.9 L/100 kg). In further embodiments, the strength enhancing admixture is present in an amount of greater than 0 to about 50 oz/cwt (greater than 0 to about 3.3 L/100 kg). In further embodiments, the strength enhancing admixture is present in an amount of greater than 0 to about 25 oz/cwt (greater than 0 to about 1.6 L/100 kg).

In further embodiments, the strength enhancing admixture is present in an amount from about 5 to about 50 oz/cwt (about 0.3 to about 3.3 L/100 kg). In further embodiments, the strength enhancing admixture is present in an amount from about 5 to about 40 oz/cwt (about 0.3 to about 2.6 L/100 kg). In further embodiments, the strength enhancing admixture is present in an amount of from about 5 to about 30 oz/cwt (about 0.3 to about 2.0 L/100 kg). In further embodiments, the strength enhancing admixture is present in an amount of from about 5 to about 25 oz/cwt (about 0.3 to about 1.6 L/100 kg). In further embodiments, the strength enhancing admixture is present in an amount of from about 5 to about 20 oz/cwt (about 0.3 to about 1.3 L/100 kg). In further embodiments, the strength enhancing admixture is present in an amount of from about 5 to about 15 oz/cwt (about 0.3 to about 1.0 L/100 kg). In further embodiments, the strength enhancing admixture is present in an amount of from about 5 to about 10 oz/cwt (about 0.3 to about 0.6 L/100 kg).

In further embodiments, the strength enhancing admixture is present in an amount of from about 10 to about 50 oz/cwt (about 0.6 to about 3.3 L/100 kg). In further embodiments, the strength enhancing admixture is present in an amount of from about 10 to about 40 oz/cwt (about 0.6 to about 2.6 L/100 kg). In further embodiments, the strength enhancing admixture is present in an amount of from about 10 to about 30 oz/cwt (about 0.6 to about 2.0 L/100 kg). In further embodiments, the strength enhancing admixture is present in an amount of from about 10 to about 25 oz/cwt (about 0.6 to about 1.6 L/100 kg). In further embodiments, the strength enhancing admixture is present in an amount of from about 10 to about 20 oz/cwt (about 0.6 to about 1.3 L/100 kg). In further embodiments, the strength enhancing admixture is present in an amount of from about 10 to about 15 oz/cwt (about 0.6 to about 1.0 L/100 kg).

Examples of suitable cementitious materials include various hydraulic cements, such as Portland cement, modified Portland cement, alumina cement, hydraulic lime, calcium aluminate cement, magnesium phosphate cement, magnesium potassium phosphate cement, calcium sulfoaluminate cement, gypsum-based cement, masonry cement, mortar cement, and combinations thereof. Portland cement refers to all cementitious compositions which have a high content of tricalcium silicate and includes Portland cement and cements that are chemically similar or analogous to Portland cement, the specification for which is set forth in ASTM specification C-150-00.

Without limitation, the pozzolanic material may comprise at least one of fly ash, limestone, slag, calcined clay, silica fume or metakaolin. Examples of a commercially available cementitious material include Lehigh Portland-Pozzolan Cement Blend and Portland Slag Cement from Leigh Hanson Heidelberg Cement Group (Irving, Tex.), and Lafarge Type I Portland cement from Lafarge Corp. (Hemdon, Va.). The blended cements are a blend of Portland cement and a combination of any one or more pozzolanic material.

The cementitious material may be present in the cementitious composition in an amount of at least about 10% by weight, based on the total dry weight of the cementitious composition. In further embodiments, the cementitious material is present in an amount of at least about 15% by weight, based on the total dry weight of the cementitious composition. In further embodiments, the cementitious material is present in an amount of at least about 20% by weight, based on the total dry weight of the cementitious composition. In further embodiments, the cementitious material is present in an amount of at least about 30% by weight, based on the total dry weight of the cementitious composition. In further embodiments, the cementitious material is present in an amount of at least about 40% by weight, based on the total dry weight of the cementitious composition. In further embodiments, the cementitious material is present in an amount of at least about 50% by weight, based on the total dry weight of the cementitious composition. In further embodiments, the cementitious material is present in an amount of at least about 60% by weight, based on the total dry weight of the cementitious composition. In further embodiments, the cementitious material is present in an amount of at least about 70% by weight, based on the total dry weight of the cementitious composition. In further embodiments, the cementitious material is present in an amount of at least about 80% by weight, based on the total dry weight of the cementitious composition. In further embodiments, the cementitious material is present in an amount of at least about 90% by weight, based on the total dry weight of the cementitious composition.

In certain embodiments, the cementitious material is present in an amount from about 15% by weight to about 90% by weight, based on the total dry weight of the cementitious composition. In further embodiments, the cementitious material is present in an amount from about 25% by weight to about 70% by weight, based on the total dry weight of the cementitious composition. In further embodiments, the cementitious material is present in an amount from about 35% by weight to about 60% by weight, based on the total dry weight of the cementitious composition. In further embodiments, the cementitious material is present in an amount from about 40% by weight to about 60% by weight, based on the total dry weight of the cementitious composition.

In certain embodiments, the cementitious composition further includes at least one aggregate. Examples of suitable aggregates include various fine and coarse aggregates such as sand, gravel, stone, lime, calcium carbonate; various fillers including light weight fillers such as hollow ceramic spheres, hollow plastic spheres, glass beads, expanded plastic beads, diatomaceous earth, vermiculite, and combinations thereof.

Fine aggregate are materials that pass through a Number 4 sieve (ASTM C125 and ASTM C33), such as sand. Coarse aggregate are materials that are retained on a Number 4 sieve, such as silica, quartz, crushed round marble, glass spheres, granite, limestone, calcite, feldspar, alluvial sands, or any other durable aggregate, and mixtures thereof.

The cementitious composition may further comprise a cement admixture or additive which is at least one of air detraining agents, air entraining agents, foaming agents, corrosion inhibitors, shrinkage reducing admixtures, water reducers, retarders, fibers, pigments, pozzolans, clays, strength enhancing agents, rheology modifying agents, water repellents, wetting agents, water soluble polymers, dampproofing admixtures, gas formers, permeability reducers, pumping aids, fungicidal admixtures, germicidal admixtures, insecticidal admixtures, aggregates, alkali-reaction reducers, bonding admixtures, or any other admixture or additive that does not adversely affect the properties of the strength enhancing admixture. In certain embodiments, the strength enhancing admixture is substantially free of chloride.

In certain embodiments, the cementitious composition further includes at least one superplasticizer. Examples of suitable superplasticizers include those that are commercially available in dry form, such as powdered superplasticizers, as well as those that are commercially available in liquid form. Superplasticizers in dry form can be mixed directly into the cementitious composition, or they can be mixed with water to form a water-based solution or dispersion prior to being mixed with the cementitious composition at the point of use.

Examples of suitable superplasticizers include polycarboxylate based superplasticizers, sulfonated melamine-formaldehyde condensate superplasticizers, casein, modified lignosulfonate superplasticizers, sulfonated naphthalene-formaldehyde condensate superplasticizers, and combinations thereof. Examples of suitable commercially available superplasticizers include those sold under the trademarks Melfux® and Melment® from BASF Corporation.

The cementitious composition may further comprise fibers made of zirconium materials, carbon, steel, fiberglass, or synthetic materials, e.g., polypropylene, nylon, polyethylene, polyester, rayon, high-strength aramid, or mixtures thereof.

The shrinkage reducing agent which can be used in the present disclosure can include, but is not limited to, alkali metal sulfates, alkaline earth metal sulfates, alkaline earth oxides, preferably sodium sulfate, superabsorbent polymers, and calcium oxide. A suitable commercially available shrinkage agent is TETRAGUARD® from Master Builders Inc. of Cleveland, Ohio.

A method is provided for preparing a cementitious composition including a strength enhancing admixture as described herein. For example, in some embodiments, the method comprises forming a mixture of water, at least one cementitious and/or pozzolanic material and a strength enhancing admixture comprising calcium silicate hydrate and at least one of: i) at least one alkanolamine; ii) at least one inorganic accelerator; or iii) at least one carbohydrate.

In some embodiments, the method of preparing a cementitious composition comprises forming a mixture of water, at least one cementitious and/or pozzolanic material and a strength enhancing admixture comprising, based on the total weight of the dry admixture, calcium silicate hydrate in an amount of from about 0.5 to about 94 weight percent and at least one of: i) at least one alkanolamine in an amount of from about 0.5 to about 55 weight percent; ii) at least one inorganic accelerator in an amount of from about 0.5 to about 85 weight percent; or iii) at least one carbohydrate in an amount of from about 0.5 to about 50 weight percent.

A method is also provided for improving early and late compressive strength of a cementitious composition, by incorporating into the cementitious composition a strength enhancing admixture as described herein. For example, the method may comprise introducing into a cementitious composition a strength enhancing admixture comprising calcium silicate hydrate and at least one of: i) at least one alkanolamine; ii) at least one inorganic accelerator; or iii) at least one carbohydrate.

In certain embodiments, the method comprises introducing into a cementitious and/or pozzolanic mixture a strength enhancing admixture comprising, based on the total weight of the dry admixture, calcium silicate hydrate in an amount of from about 0.5 to about 94 weight percent and at least one of: i) at least one alkanolamine in an amount of from about 0.5 to about 55 weight percent; ii) at least one inorganic accelerator in an amount of from about 0.5 to about 85 weight percent; or iii) at least one carbohydrate in an amount of from about 0.5 to about 50 weight percent.

The disclosure provided herein will be described further by way of the following examples. The following examples are set forth merely to further illustrate the subject strength enhancing admixture and/or cementitious composition. The illustrative examples should not be construed as limiting the strength enhancing admixture and/or cementitious composition in any manner.

Tables 1 through 18 are sample mortar compositions comprising various admixtures or no admixture. Tables 19 through 31 are sample concrete compositions comprising various admixtures or no admixture. The sample mortar and concrete compositions listed below were prepared and tested to determine their 1-day, 7-day and 28-day compressive strength characteristics according to ASTM C39. The ASTM C39 standard is incorporated herein as if fully written out below. The percentages of admixture components indicated in the Examples are based on the total dry weight of the admixture. The admixtures shown in Tables 1 through 31 comprised calcium silicate hydrate which included residual material from the production process, referred to hereafter as calcium silicate hydrate or CSH for simplicity. Specifically, the calcium silicate hydrate used in the following examples was obtained by the reaction of a water-soluble calcium compound with a water-soluble silicate compound in presence of a water-soluble dispersant (such as the calcium silicate hydrate described in WO 2010/026155 A1). Similar results may be expected with other calcium silicate hydrate compounds, such as those described in U.S. Pat. No. 8,653,186 B2, US 2015/0197448 A1 and WO 2016/097181 A1.

Samples 1-71 were prepared using a blended mortar composition comprising Lehigh cement and fly ash to create mortar compositions with admixture dosages according to Table 1A. All the samples contained cement, fly ash, sand and water. In all of the samples, sand was present in an amount of 2,500 grams/batch, cement and fly ash were present in an amount of 770 grams/batch each, and water was present in an amount of 616 grams/batch. The water to cementitious material ratio of all the samples was 0.40. Table 1B provides the percentage of each of the following admixture ingredients, based on the total dry weight of the admixture: calcium silicate hydrate ("CSH"); triisopropanolamine ("TIPA"); corn syrup ("CS"); sodium thiocyanate (NaSCN); and calcium nitrate (Ca(NO$_3$)$_2$).

TABLE 1A

| Sample | 1-day (% increase) | 7-day (% increase) | 28-day (% increase) | Admixture Dosage (oz/cwt) |
|---|---|---|---|---|
| 1 | 0 | 0 | 0 | 0.00 |
| 2 | 27 | 19 | 17 | 5.73 |
| 3 | 46 | 28 | 15 | 6.83 |
| 4 | 38 | 15 | 18 | 7.78 |
| 5 | 34 | 22 | 24 | 8.10 |
| 6 | 27 | 28 | 22 | 8.85 |
| 7 | 48 | 28 | 22 | 8.88 |
| 8 | 25 | 30 | 26 | 9.94 |
| 9 | 28 | 25 | 22 | 10.14 |
| 10 | 45 | 22 | 15 | 10.94 |
| 11 | 24 | 22 | 7 | 10.96 |
| 12 | 36 | 26 | 6 | 11.07 |
| 13 | 41 | 34 | 28 | 11.23 |
| 14 | 5 | 10 | 8 | 11.42 |
| 15 | 32 | 37 | 24 | 11.47 |
| 16 | 33 | 27 | 27 | 11.80 |
| 17 | 43 | 21 | 4 | 11.90 |
| 18 | 40 | 21 | 19 | 12.16 |
| 19 | 37 | 34 | 34 | 12.66 |
| 20 | 47 | 35 | 21 | 12.76 |
| 21 | -2 | -6 | -1 | 12.80 |
| 22 | 44 | 29 | 16 | 12.92 |
| 23 | 39 | 23 | 16 | 12.99 |
| 24 | 55 | 28 | 23 | 13.12 |
| 25 | 30 | 31 | 17 | 13.25 |
| 26 | 45 | 20 | 11 | 13.68 |
| 27 | 36 | 29 | 15 | 13.74 |
| 28 | 48 | 39 | 19 | 14.10 |
| 29 | 28 | 29 | 26 | 14.69 |
| 30 | 42 | 18 | 10 | 14.78 |
| 31 | 24 | 37 | 34 | 14.91 |
| 32 | 54 | 30 | 22 | 15.17 |
| 33 | 40 | 34 | 25 | 15.56 |
| 34 | 51 | 31 | 18 | 16.15 |
| 35 | 21 | 27 | 7 | 16.19 |
| 36 | 37 | 32 | 25 | 16.60 |
| 37 | 31 | 21 | 17 | 17.08 |
| 38 | 25 | 8 | 6 | 18.29 |
| 39 | 24 | 16 | 15 | 20.81 |
| 40 | 48 | 27 | 17 | 21.34 |
| 41 | 33 | 27 | 11 | 22.03 |
| 42 | 18 | 16 | 16 | 22.84 |
| 43 | 21 | 22 | 13 | 25.03 |
| 44 | 14 | 6 | 1 | 25.70 |
| 45 | 47 | 38 | 24 | 25.71 |
| 46 | 28 | 0 | -2 | 26.84 |
| 47 | 38 | 11 | 3 | 26.84 |
| 48 | 37 | 25 | 4 | 27.29 |
| 49 | 37 | 14 | 7 | 27.37 |
| 50 | 53 | 25 | 14 | 27.52 |
| 51 | 42 | 41 | 26 | 27.76 |
| 52 | 47 | 29 | 13 | 28.19 |
| 53 | 45 | 32 | 17 | 29.55 |
| 54 | 43 | 28 | 20 | 30.64 |
| 55 | 38 | 19 | 5 | 31.81 |
| 56 | 40 | 33 | 17 | 32.27 |
| 57 | 57 | 52 | 25 | 49.68 |
| 58 | 47 | 13 | 5 | 51.00 |
| 59 | 89 | 43 | 32 | 69.81 |
| 60 | 64 | 17 | 11 | 77.00 |
| 61 | -77 | -34 | -26 | 145.80 |
| 62 | -98 | -99 | -98 | 195.50 |
| 63 | 89 | 52 | 37 | 207.30 |
| 64 | 81 | 55 | 42 | 209.48 |
| 65 | 40 | 45 | 35 | 211.67 |
| 66 | 83 | 47 | 34 | 216.50 |
| 67 | 83 | 54 | 35 | 218.69 |
| 68 | -23 | -6 | -4 | 221.00 |
| 69 | 43 | 47 | 34 | 223.06 |
| 70 | 4 | 47 | 37 | 225.24 |
| 71 | 60 | 22 | 8 | 227.43 |

TABLE 1B

| Sample | CSH | TIPA | CS | NaSCN | Ca(NO$_3$)$_2$ |
|---|---|---|---|---|---|
| 1 | 0 | 0 | 0 | 0 | 0 |
| 2 | 5.87 | 18.83 | 0 | 75.30 | 0 |
| 3 | 4.94 | 15.84 | 15.84 | 63.37 | 0 |
| 4 | 23.77 | 15.25 | 0 | 60.98 | 0 |
| 5 | 15.39 | 14.10 | 14.10 | 56.41 | 0 |
| 6 | 3.35 | 42.96 | 10.74 | 42.96 | 0 |
| 7 | 20.63 | 13.23 | 13.23 | 52.91 | 0 |
| 8 | 3.02 | 38.79 | 19.40 | 38.79 | 0 |
| 9 | 10.82 | 39.64 | 9.91 | 39.64 | 0 |
| 10 | 3.02 | 19.40 | 0 | 77.58 | 0 |
| 11 | 1.92 | 19.23 | 1.92 | 76.92 | 0 |
| 12 | 3.85 | 19.23 | 0 | 76.92 | 0 |
| 13 | 9.84 | 36.06 | 18.03 | 36.06 | 0 |
| 14 | 79.59 | 20.41 | 0 | 0 | 0 |
| 15 | 1.67 | 40.00 | 8.33 | 50.00 | 0 |
| 16 | 3.28 | 39.34 | 8.20 | 49.18 | 0 |
| 17 | 3.85 | 0 | 19.23 | 76.92 | 0 |
| 18 | 3.51 | 17.54 | 8.77 | 70.18 | 0 |
| 19 | 0.74 | 44.12 | 11.03 | 44.12 | 0 |
| 20 | 0.83 | 16.53 | 16.53 | 66.12 | 0 |
| 21 | 100 | 0 | 0 | 0 | 0 |
| 22 | 1.64 | 16.39 | 16.39 | 65.57 | 0 |
| 23 | 13.49 | 17.30 | 0 | 69.21 | 0 |
| 24 | 2.53 | 16.24 | 16.24 | 64.98 | 0 |
| 25 | 3.23 | 16.13 | 16.13 | 64.52 | 0 |
| 26 | 12.89 | 0 | 17.42 | 69.69 | 0 |
| 27 | 18.92 | 13.51 | 13.51 | 54.05 | 0 |
| 28 | 3.29 | 16.12 | 16.12 | 64.47 | 0 |
| 29 | 3.35 | 42.96 | 10.74 | 42.96 | 0 |
| 30 | 11.86 | 0 | 24.04 | 64.10 | 0 |
| 31 | 3.02 | 38.79 | 19.40 | 38.79 | 0 |
| 32 | 11.50 | 14.75 | 14.75 | 59.00 | 0 |
| 33 | 32.67 | 29.93 | 7.48 | 29.93 | 0 |
| 34 | 1.64 | 16.39 | 16.39 | 65.57 | 0 |
| 35 | 2.11 | 10.53 | 10.53 | 24.21 | 52.63 |
| 36 | 4.94 | 15.84 | 15.84 | 63.37 | 0 |
| 37 | 17.92 | 16.42 | 0 | 65.67 | 0 |
| 38 | 21.44 | 0 | 0 | 78.56 | 0 |
| 39 | 93.98 | 6.02 | 0 | 0 | 0 |
| 40 | 1.54 | 19.69 | 0 | 78.77 | 0 |
| 41 | 74.36 | 12.82 | 12.82 | 0 | 0 |
| 42 | 79.59 | 20.41 | 0 | 0 | 0 |
| 43 | 72.22 | 18.52 | 9.26 | 0 | 0 |
| 44 | 100 | 0 | 0 | 0 | 0 |
| 45 | 1.28 | 16.45 | 16.45 | 65.81 | 0 |
| 46 | 72.22 | 0 | 9.26 | 18.52 | 0 |
| 47 | 72.22 | 0 | 9.26 | 18.52 | 0 |
| 48 | 66.10 | 16.95 | 8.47 | 8.47 | 0 |
| 49 | 66.40 | 16.95 | 0 | 16.95 | 0 |
| 50 | 69.03 | 4.42 | 8.85 | 17.70 | 0 |
| 51 | 6.10 | 15.65 | 15.65 | 62.60 | 0 |
| 52 | 66.10 | 8.47 | 8.47 | 16.95 | 0 |
| 53 | 60.94 | 15.63 | 7.81 | 15.63 | 0 |
| 54 | 58.65 | 15.04 | 11.28 | 15.04 | 0 |
| 55 | 56.52 | 14.49 | 7.25 | 21.74 | 0 |
| 56 | 52.70 | 27.03 | 6.76 | 13.51 | 0 |
| 57 | 75.73 | 9.71 | 4.85 | 9.71 | 0 |
| 58 | 100 | 0 | 0 | 0 | 0 |
| 59 | 82.39 | 7.04 | 3.52 | 7.04 | 0 |
| 60 | 100 | 0 | 0 | 0 | 0 |
| 61 | 0 | 100 | 0 | 0 | 0 |
| 62 | 0 | 0 | 100 | 0 | 0 |
| 63 | 62.50 | 11.6 | 3.41 | 22.73 | 0 |
| 64 | 61.80 | 11.24 | 4.49 | 22.47 | 0 |
| 65 | 61.11 | 11.11 | 5.56 | 22.22 | 0 |
| 66 | 57.29 | 20.83 | 1.04 | 20.83 | 0 |

TABLE 1B-continued

| Sample | CSH | TIPA | CS | NaSCN | Ca(NO$_3$)$_2$ |
|---|---|---|---|---|---|
| 67 | 56.70 | 20.62 | 2.06 | 20.62 | 0 |
| 68 | 0 | 0 | 0 | 100 | 0 |
| 69 | 55.56 | 20.20 | 4.04 | 20.20 | 0 |
| 70 | 55.00 | 20.00 | 5.00 | 20.00 | 0 |
| 71 | 63.58 | 11.56 | 1.73 | 23.12 | 0 |

As shown in Table 1A, the strength enhancing admixture comprising calcium silicate hydrate and at least one of: i) at least one alkanolamine; ii) at least one inorganic accelerator; or iii) at least one carbohydrate provided a significantly higher strengthening effect, as compared to the samples that did not include an admixture. For example, in Sample 2, a strength enhancing admixture comprising CSH, TIPA and NaSCN was added to a cementitious composition, at a dosage of 5.73 oz/cwt, and resulted in a 27% 1-day increase, a 19% 7-day increase, and a 17% 28-day increase in compressive strength of the cementitious material, as compared to Sample 1 which did not include an admixture.

Similarly, in Sample 3, a strength enhancing admixture comprising CSH, TIPA, CS and NaSCN was added to a cementitious composition, at a dosage of 6.83 oz/cwt, and resulted in a 46% 1-day increase, a 28% 7-day increase, and a 15% 28-day increase in compressive strength of the cementitious material, as compared to Sample 1 which did not include an admixture.

The results also show that the strength enhancing admixture comprising calcium silicate hydrate and at least one of: i) at least one alkanolamine; ii) at least one inorganic accelerator; or iii) at least one carbohydrate provided a significantly higher strengthening effect, as compared to admixtures comprising calcium silicate hydrate alone. For example, in Sample 21, an admixture comprising 100% CSH was added to a cementitious material, at a dosage of 12.80 oz/cwt, and resulted in a 2% 1-day decrease, a 6% 7-day decrease, and a 1% 28-day decrease in compressive strength of the cementitious material, as compared to Sample 1 which did not include an admixture. In Sample 20, an admixture comprising CSH, TIPA, CS and NaSCN was added to the same cementitious composition, at a dosage of 12.76 oz/cwt, and resulted in a 47% 1-day increase, a 35% 7-day increase, and a 21% 28-day increase in compressive strength of the cementitious material, as compared to Sample 1 which did not include an admixture. This observed level of performance demonstrates a synergistic effect of calcium silicate hydrate and at least one of: i) at least one alkanolamine; ii) at least one inorganic accelerator; or iii) at least one carbohydrate.

Table 1A also shows that the addition of admixtures comprising an alkanolamine, a carbohydrate or an inorganic accelerator alone, even at very high dosages, does not impart a strengthening effect to the cementitious material. Rather, it has surprisingly been found that the improved strengthening effect is due to the synergistic combination of calcium silicate hydrate and at least one of: i) at least one alkanolamine; ii) at least one inorganic accelerator; or iii) at least one carbohydrate.

For example, in Sample 61, an admixture comprising 100% TIPA was added to a cementitious material, at a dosage of 145.80 oz/cwt, and resulted in a 77% 1-day decrease, a 34% 7-day decrease, and a 26% 28-day decrease in compressive strength of the cementitious material, as compared to Sample 1 which did not include an admixture. In contrast, in Sample 59, an admixture comprising CSH, TIPA, CS and NaSCN was added to the same cementitious material as Sample 61, at a much lower dosage of 69.81% oz/cwt, and resulted in a 89% 1-day increase, 43% 7-day increase, and a 32% 28-day increase, as compared to Sample 1 which did not include an admixture.

In Sample 62, an admixture comprising 100% CS was added to a cementitious composition, at a dosage of 195.50 oz/cwt, and resulted in a 98% 1-day decrease, a 99% 7-day decrease, and a 98% 28-day decrease in compressive strength of the cementitious material, as compared to Sample 1 which did not include an admixture. In contrast, in Sample 63, an admixture comprising CSH, TIPA, CS and NaSCN was added to the same cementitious material as Sample 62, at a dosage of 207.30% oz/cwt, and resulted in an 89% 1-day increase, a 52% 7-day increase, and a 37% 28-day increase, as compared to Sample 1 which did not include an admixture.

In Sample 68, an admixture comprising 100% NaSCN was added to a cementitious composition, at a dosage of 221.00 oz/cwt, and resulted in a 23% 1-day decrease, a 6% 7-day decrease, and a 4% 28-day decrease in compressive strength of the cementitious material, as compared to Sample 1 which did not include an admixture. In contrast, in Sample 67, an admixture comprising CSH, TIPA, CS and NaSCN was added to the same cementitious material as Sample 68, at a lower dosage of 218.69% oz/cwt, and resulted in an 83% 1-day increase, 54% 7-day increase, and a 35% 28-day increase, as compared to Sample 1 which did not include an admixture.

In Sample 14, an admixture comprising CSH and TIPA was added to a cementitious composition, at a dosage 11.42 oz/cwt, and resulted in a 5% 1-day increase, a 10% 7-day increase, and a 8% 28-day increase in compressive strength of the cementitious material, as compared to Sample 1 which did not include an admixture. In contrast, in Sample 15, an admixture comprising CSH, TIPA, CS and NaSCN was added to the same cementitious material as Sample 14, at a dosage of 11.47 oz/cwt, and resulted in a 32% 1-day increase, 37% 7-day increase, and a 24% 28-day increase, as compared to Sample 1 which did not include an admixture.

In Sample 38, an admixture comprising CSH and NaSCN was added to a cementitious composition, at a dosage 18.29 oz/cwt, and resulted in a 25% 1-day increase, a 8% 7-day increase, and a 6% 28-day increase in compressive strength of the cementitious material, as compared to Sample 1 which did not include an admixture. In Sample 39, an admixture comprising CSH and TIPA was added to a cementitious composition, at a dosage 20.81 oz/cwt, and resulted in a 24% 1-day increase, a 16% 7-day increase, and a 15% 28-day increase in compressive strength of the cementitious material, as compared to Sample 1 which did not include an admixture. In contrast, Sample 36, an admixture comprising CSH, TIPA, CS and NaSCN was added to the same cementitious material as Samples 38 and 39, at a dosage of 16.60 oz/cwt, and resulted in a 37% 1-day increase, 32% 7-day increase, and a 25% 28-day increase, as compared to Sample 1 which did not include an admixture.

In Sample 42, an admixture comprising CSH and TIPA was added to a cementitious composition, at a dosage 22.84 oz/cwt, and resulted in a 18% 1-day increase, a 16% 7-day increase, and a 16% 28-day increase in compressive strength of the cementitious material, as compared to Sample 1 which did not include an admixture. In Sample 45, an admixture comprising CSH, TIPA, CS and NaSCN was added to the same cementitious material as Sample 42, at a dosage of 25.71 oz/cwt, and resulted in a 47% 1-day increase, 38% 7-day increase, and a 24% 28-day increase, as compared to Sample 1 which did not include an admixture.

In Sample 4, an admixture comprising CSH, TIPA and NaSCN was added to a cementitious composition, at a dosage 7.78 oz/cwt, and resulted in a 38% 1-day increase, a 15% 7-day increase, and a 18% 28-day increase in compressive strength of the cementitious material, as compared to Sample 1 which did not include an admixture. In Sample 3, an admixture comprising CSH, TIPA, CS and NaSCN was added to the same cementitious material as Sample 4, at a lower dosage of 6.83 oz/cwt, and resulted in a 46% 1-day increase, 28% 7-day increase, and a 15% 28-day increase, as compared to Sample 1 which did not include an admixture.

In Sample 17, an admixture comprising CSH, CS and NaSCN was added to a cementitious composition, at a dosage 11.90 oz/cwt, and resulted in a 43% 1-day increase, a 21% 7-day increase, and a 4% 28-day increase in compressive strength of the cementitious material, as compared to Sample 1 which did not include an admixture. In Sample 16, an admixture comprising CSH, TIPA, CS and NaSCN was added to the same cementitious material as Sample 17, at a lower dosage of 11.80 oz/cwt, and resulted in a 33% 1-day increase, 27% 7-day increase, and a 27% 28-day increase, as compared to Sample 1 which did not include an admixture.

In Sample 43, an admixture comprising CSH, TIPA and CS was added to a cementitious composition, at a dosage 25.03 oz/cwt, and resulted in a 21% 1-day increase, a 22% 7-day increase, and a 13% 28-day increase in compressive strength of the cementitious material, as compared to Sample 1 which did not include an admixture. In Sample 45, an admixture comprising CSH, TIPA, CS and NaSCN was added to the same cementitious material as Sample 43, at a dosage of 25.71 oz/cwt, and resulted in a 47% 1-day increase, 38% 7-day increase, and a 24% 28-day increase, as compared to Sample 1 which did not include an admixture.

Table 1A shows a significant improvement in early and final compressive strengths of cementitious material comprising the strength enhancing admixture, as compared to cementitious material with no admixture or to cementitious material with an admixture comprising CSH alone.

Samples 72 and 73 were prepared using a blended mortar composition comprising Lehigh cement and fly ash to create mortar compositions with admixture dosages according to Table 2A. In Samples 72 and 73, sand was present in an amount of 2,500 grams/batch, cement was present in an amount of 770 grams/batch, slag was present in an amount of 1,001 grams/batch, and water was present in an amount of 693 grams/batch. The water to cementitious material ratio of all the samples was 0.45. Table 2B provides the percentage of each of the following admixture ingredients, based on the total dry weight of the admixture: CSH, TIPA, CS, NaSCN and Ca(NO$_3$)$_2$.

TABLE 2A

| Sample | 1-day (% increase) | 7-day (% increase) | 28-day (% increase) | Admixture Dosage (oz/cwt) |
|---|---|---|---|---|
| 72 | 0 | 0 | 0 | 0.00 |
| 73 | 65 | 61 | 28 | 29.55 |

TABLE 2B

| Sample | CSH | TIPA | CS | NaSCN | Ca(NO$_3$)$_2$ |
|---|---|---|---|---|---|
| 72 | 0 | 0 | 0 | 0 | 0 |
| 73 | 60.94 | 15.63 | 7.81 | 15.63 | 0 |

Table 2A shows a significant improvement in early and final compressive strengths of blended mortar compositions comprising the subject strength enhancing admixture, as compared to the same mortar composition having no admixture.

Samples 74 and 75 were prepared using a blended mortar composition comprising Lehigh cement and milled limestone to create mortar compositions with admixture dosages according to Table 3A. In Samples 74 and 75, sand was present in an amount of 2,500 grams/batch, cement was present in an amount of 1,001 grams/batch, milled limestone was present in an amount of 539 grams/batch, and water was present in an amount of 616 grams/batch. The water to cementitious material ratio of all the samples was 0.40. Table 3B provides the percentage of each of the following admixture ingredients, based on the total dry weight of the admixture: CSH, TIPA, CS, NaSCN and Ca(NO$_3$)$_2$.

TABLE 3A

| Sample | 1-day (% increase) | 7-day (% increase) | 28-day (% increase) | Admixture Dosage (oz/cwt) |
|---|---|---|---|---|
| 74 | 0 | 0 | 0 | 0.00 |
| 75 | 45 | 31 | 24 | 29.55 |

TABLE 3B

| Sample | CSH | TIPA | CS | NaSCN | Ca(NO$_3$)$_2$ |
|---|---|---|---|---|---|
| 74 | 0 | 0 | 0 | 0 | 0 |
| 75 | 60.94 | 15.63 | 7.81 | 15.63 | 0 |

Table 3A shows a significant improvement in early and final compressive strengths of blended mortar compositions comprising the subject strength enhancing admixture, as compared to the same mortar composition having no admixture.

Samples 76-83 were prepared using a mortar composition comprising Lehigh cement to create mortar compositions with admixture dosages according to Table 4A. All the samples contained cement, sand and water. In all of the samples, sand was present in an amount of 2,500 grams/batch, cement was present in an amount of 1,500 grams/batch, and water was present in an amount of 705 grams/batch. The water to cementitious material ratio of all the samples was 0.47. Table 4B provides the percentage of each of the following admixture ingredients, based on the total dry weight of the admixture: CSH, TIPA, CS and NaSCN.

TABLE 4A

| Sample | 1-day (% increase) | 7-day (% increase) | 28-day (% increase) | Admixture Dosage (oz/cwt) |
|---|---|---|---|---|
| 76 | 0 | 0 | 0 | 0.00 |
| 77 | 18 | 19 | 7 | 22.84 |
| 78 | 33 | −6 | −4 | 25.70 |
| 79 | 42 | 9 | 4 | 26.84 |
| 80 | 31 | 17 | 7 | 27.37 |
| 81 | 41 | 15 | 10 | 29.55 |
| 82 | 62 | 32 | 17 | 69.81 |
| 83 | 63 | 15 | 4 | 77.00 |

TABLE 4B

| Sample | CSH | TIPA | CS | NaSCN |
|---|---|---|---|---|
| 76 | 0 | 0 | 0 | 0 |
| 77 | 79.59 | 20.41 | 0 | 0 |
| 78 | 100.00 | 0 | 0 | 0 |
| 79 | 72.22 | 0 | 9.26 | 18.52 |
| 80 | 66.10 | 16.95 | 0 | 16.95 |
| 81 | 60.94 | 15.63 | 7.81 | 15.63 |
| 82 | 82.39 | 7.04 | 3.52 | 7.04 |
| 83 | 100.00 | 0 | 0 | 0 |

Table 4A shows a significant improvement in early and final compressive strengths of mortar compositions comprising the subject strength enhancing admixture, as compared to the same mortar composition having no admixture.

The results also show that the strength enhancing admixture comprising calcium silicate hydrate and at least one of: i) at least one alkanolamine; ii) at least one inorganic accelerator; or iii) at least one carbohydrate provided a significantly higher strengthening effect, as compared to admixtures comprising calcium silicate hydrate alone.

For example, in Sample 78, an admixture comprising 100% CSH was added to a cementitious material, at a dosage of 25.70 oz/cwt, and resulted in a 33% 1-day increase, a 6% 7-day decrease, and a 4% 28-day decrease in compressive strength of the cementitious material, as compared to Sample 76 which did not include an admixture. In Sample 79, a strength enhancing admixture comprising CSH and NaSCN was added to a cementitious composition, at a dosage of 26.84 oz/cwt, and resulted in a 42% 1-day increase, a 9% 7-day increase, and a 4% 28-day increase in compressive strength of the cementitious material, as compared to Sample 76 which did not include an admixture. In Sample 80, a strength enhancing admixture comprising CSH and TIPA was added to a cementitious composition, at a dosage of 27.37 oz/cwt, and resulted in a 31% 1-day increase, a 17% 7-day increase, and a 7% 28-day increase in compressive strength of the cementitious material, as compared to Sample 76 which did not include an admixture. In Sample 81, a strength enhancing admixture comprising CSH, TIPA, CS and NaSCN was added to a cementitious composition, at a dosage of 29.55 oz/cwt, and resulted in a 41% 1-day increase, a 15% 7-day increase, and a 10% 28-day increase in compressive strength of the cementitious material, as compared to Sample 76 which did not include an admixture.

Table 4A also shows that using a higher dosage of an admixture containing calcium silicate hydrate alone does not result in similar 7-day and 28-day strength characteristics provided by lower dosage applications of the strength enhancing admixture comprising calcium silicate hydrate and at least one of: i) at least one alkanolamine; ii) at least one inorganic accelerator; or iii) at least one carbohydrate.

For example, in Sample 83, an admixture comprising 100% CSH was added to a cementitious composition, at a dosage of 77.00 oz/cwt, and resulted in a 15% 7-day increase and a 4% 28-day increase in compressive strength of the cementitious material, as compared to Sample 76 which did not include an admixture. In Sample 82, an admixture comprising CSH, an alkanolamine, a carbohydrate and an inorganic accelerator was added to the same cementitious composition, at a dosage of 69.81 oz/cwt (which is about 10% less than the dosage used in Sample 83), and resulted in a 32% 7-day increase and a 17% 28-day increase in compressive strength of the cementitious material, as compared to Sample 76 which did not include an admixture.

Samples 84-93 were prepared using a blended mortar composition comprising Hercules cement and fly ash to create mortar compositions with admixture dosages according to Table 5A. All the samples contained cement, fly ash, sand and water. In all the samples, sand was present in an amount of 2,500 grams/batch, cement and fly ash were present in an amount of 770 grams/batch each, and water was present in an amount of 616 grams/batch. The water to cementitious material ratio of all the samples was 0.40. Table 5B provides the percentage of each of the following admixture ingredients, based on the total dry weight of the admixture: CSH, TIPA, CS and NaSCN.

TABLE 5A

| Sample | 1-day (% increase) | 7-day (% increase) | 28-day (% increase) | Admixture Dosage (oz/cwt) |
|---|---|---|---|---|
| 84 | 0 | 0 | 0 | 0.00 |
| 85 | 38 | 21 | 18 | 8.10 |
| 86 | 53 | 33 | 21 | 8.85 |
| 87 | 47 | 29 | 20 | 9.94 |
| 88 | 47 | 31 | 23 | 10.14 |
| 89 | 51 | 31 | 21 | 11.23 |
| 90 | 54 | 31 | 21 | 14.69 |
| 91 | 51 | 34 | 24 | 14.91 |
| 92 | 46 | 31 | 24 | 16.60 |
| 93 | 14 | −4 | −8 | 33.00 |

TABLE 5B

| Sample | CSH | TIPA | CS | NaSCN |
|---|---|---|---|---|
| 84 | 0 | 0 | 0 | 0 |
| 85 | 15.39 | 14.10 | 14.10 | 56.41 |
| 86 | 3.35 | 42.96 | 10.74 | 42.96 |
| 87 | 3.02 | 38.79 | 19.40 | 38.79 |
| 88 | 10.82 | 39.64 | 9.91 | 39.64 |
| 89 | 9.84 | 36.06 | 18.03 | 36.06 |
| 90 | 3.35 | 42.96 | 10.74 | 42.96 |
| 91 | 3.02 | 38.79 | 19.40 | 38.79 |
| 92 | 4.94 | 15.884 | 15.84 | 63.37 |
| 93 | 100.00 | 0 | 0 | 0 |

Table 5A shows a significant improvement in early and final compressive strengths of mortar compositions comprising the subject strength enhancing admixture, as compared to the same mortar composition having no admixture. Table 5A also shows that an admixture comprising CSH alone, and which is added to the cementitious composition at a significantly higher dosage than the subject strength enhancing admixture, does not result in similar strength characteristics as provided by the strength enhancing admixture.

For example, in Sample 93, an admixture comprising 100% CSH was added to a cementitious composition, at a dosage of 33.00 oz/cwt, and resulted in a 14% 1-day increase, 4% 7-day decrease, and a 8% 28-day decrease in compressive strength of the cementitious material, as compared to Sample 84 which did not include an admixture. In Sample 92, an admixture comprising CSH, an alkanolamine, a carbohydrate and an inorganic accelerator was added to the same cementitious composition, at a dosage of 16.60 oz/cwt (which is about half the dosage used in Sample 93), and resulted in a 46% 1-day increase, a 31% 7-day increase, and a 24% 28-day increase in compressive strength of the cementitious material, as compared to Sample 84 which did not include an admixture.

Samples 94-102 were prepared using a blended mortar composition comprising Lehigh cement and fly ash to create mortar compositions with admixture dosages according to Table 6A. All the samples contained cement, fly ash, sand and water. In all of the samples, sand was present in an amount of 2,500 grams/batch, cement and fly ash were present in an amount of 885 grams/batch each, and water was present in an amount of 531 grams/batch. The water to cementitious material ratio of all the samples was 0.30. Table 6B provides the percentage of each of the following admixture ingredients, based on the total dry weight of the admixture: CSH, TIPA, CS and NaSCN.

TABLE 6A

| Sample | 1-day (% increase) | 7-day (% increase) | 28-day (% increase) | Admixture Dosage (oz/cwt) |
|---|---|---|---|---|
| 94 | 0 | 0 | 0 | 0.00 |
| 95 | 7 | 19 | 11 | 4.98 |
| 96 | 6 | 18 | 11 | 6.01 |
| 97 | 1 | 17 | 13 | 6.56 |
| 98 | 6 | 17 | 15 | 9.95 |
| 99 | 4 | 22 | 10 | 12.03 |
| 100 | 0 | 19 | 9 | 13.12 |
| 101 | 1 | 14 | 11 | 13.74 |
| 102 | 4 | 19 | 6 | 24.06 |

TABLE 6B

| Sample | CSH | TIPA | CS | NaSCN |
|---|---|---|---|---|
| 94 | 0 | 0 | 0 | 0 |
| 95 | 3.02 | 38.79 | 19.40 | 38.79 |
| 96 | 2.76 | 17.68 | 8.84 | 70.72 |
| 97 | 2.53 | 16.24 | 16.24 | 64.98 |
| 98 | 3.02 | 38.79 | 19.40 | 38.79 |
| 99 | 2.76 | 17.68 | 8.84 | 70.72 |
| 100 | 2.53 | 16.24 | 16.24 | 64.98 |
| 101 | 18.92 | 13.51 | 13.51 | 54.05 |
| 102 | 2.76 | 17.68 | 8.84 | 70.72 |

Table 6A shows a significant improvement in early and final compressive strengths of mortar compositions comprising the subject strength enhancing admixture, as compared to the same mortar composition having no admixture. For example, in Sample 95, an admixture comprising CSH, TIPA, CS and NaSCN was added to a cementitious composition, at a dosage of 4.98 oz/cwt, and resulted in a 7% 1-day increase, 19% 7-day increase, and a 11% 28-day increase in compressive strength of the cementitious material, as compared to Sample 94 which did not include an admixture Samples 103-107 were prepared using a blended mortar composition comprising Lehigh cement and fly ash to create mortar compositions with admixture dosages according to Table 7A. In Samples 103-107, sand was present in an amount of 2,500 grams/batch, cement and fly ash were present in an amount of 770 grams/batch each, and water was present in an amount of 462 grams/batch. The water to cementitious material ratio of all the samples was 0.30. Table 7B provides the percentage of each of the following admixture ingredients, based on the total dry weight of the admixture: CSH, TIPA, CS and NaSCN.

TABLE 7A

| Sample | 1-day (% increase) | 7-day (% increase) | 28-day (% increase) | Admixture Dosage (oz/cwt) |
|---|---|---|---|---|
| 103 | 0 | 0 | 0 | 0.00 |
| 104 | 12 | 11 | 40 | 12.16 |
| 105 | 12 | 13 | 32 | 12.92 |
| 106 | 9 | 14 | 41 | 13.25 |
| 107 | 5 | −2 | 33 | 13.68 |

TABLE 7B

| Sample | CSH | TIPA | CS | NaSCN |
|---|---|---|---|---|
| 103 | 0 | 0 | 0 | 0 |
| 104 | 3.51 | 17.54 | 8.77 | 70.18 |
| 105 | 1.64 | 16.39 | 16.39 | 65.57 |
| 106 | 3.23 | 16.13 | 16.13 | 64.52 |
| 107 | 12.89 | 0 | 17.42 | 69.69 |

Table 7A shows a significant improvement in early and final compressive strengths of mortar compositions comprising the subject strength enhancing admixture, as compared to the same mortar composition having no admixture. For example, in Sample 107, an admixture comprising CSH, CS and NaSCN was added to a cementitious composition, at a dosage of 13.68 oz/cwt, and resulted in a 5% 1-day increase, 2% 7-day decrease, and a 33% 28-day increase in compressive strength of the cementitious material, as compared to Sample 103 which did not include an admixture. In Sample 106, an admixture comprising CSH, TIPA, CS, and NaSCN was added to a cementitious composition, at a dosage of 13.25 oz/cwt, and resulted in a 9% 1-day increase, 14% 7-day increase, and a 41% 28-day increase in compressive strength of the cementitious material, as compared to Sample 103 which did not include an admixture.

Samples 108-112 were prepared using a blended mortar composition comprising Lehigh cement and fly ash to create mortar compositions with admixture dosages according to Table 8A. In Samples 108-112, sand was present in an amount of 2,500 grams/batch, cement was present in an amount of 1,029 grams/batch, fly ash was present in an amount of 441 grams/batch, and water was present in an amount of 750 grams/batch. The water to cementitious material ratio of all the samples was 0.51. Table 8B provides the percentage of each of the following admixture ingredients, based on the total dry weight of the admixture: CSH, TIPA, CS and NaSCN.

TABLE 8A

| Sample | 1-day (% increase) | 7-day (% increase) | 28-day (% increase) | Admixture Dosage (oz/cwt) |
|---|---|---|---|---|
| 108 | 0 | 0 | 0 | 0.00 |
| 109 | 59 | 39 | 25 | 13.30 |
| 110 | 58 | 45 | 30 | 18.99 |
| 111 | 59 | 52 | 32 | 17.73 |
| 112 | 67 | 49 | 23 | 26.60 |

TABLE 8B

| Sample | CSH | TIPA | CS | NaSCN |
|---|---|---|---|---|
| 108 | 0 | 0 | 0 | 0 |
| 109 | 0.74 | 44.12 | 11.03 | 44.12 |
| 110 | 0.74 | 44.12 | 11.03 | 44.12 |
| 111 | 0.55 | 33.15 | 11.05 | 55.25 |
| 112 | 0.55 | 33.15 | 11.05 | 55.25 |

Table 8A shows a significant improvement in early and final compressive strengths of mortar compositions comprising the subject strength enhancing admixture, as compared to the same mortar composition having no admixture. For example, in Sample 109, an admixture comprising CSH, TIPA, CS and NaSCN was added to a cementitious composition, at a dosage of 13.30 oz/cwt, and resulted in a 59% 1-day increase, 39% 7-day increase, and a 25% 28-day increase in compressive strength of the cementitious material, as compared to Sample 108 which did not include an admixture.

Samples 113-117 were prepared using a blended mortar composition comprising Lehigh cement and fly ash to create mortar compositions with admixture dosages according to Table 9A. In Samples 113-117, sand was present in an amount of 2,500 grams/batch, cement was present in an amount of 882 grams/batch, fly ash was present in an amount of 588 grams/batch, and water was present in an amount of 750 grams/batch. The water to cementitious material ratio of all the samples was 0.51. Table 9B provides the percentage of each of the following admixture ingredients, based on the total dry weight of the admixture: CSH, TIPA, CS and NaSCN.

TABLE 9A

| Sample | 1-day (% increase) | 7-day (% increase) | 28-day (% increase) | Admixture Dosage (oz/cwt) |
|---|---|---|---|---|
| 113 | 0 | 0 | 0 | 0.00 |
| 114 | 52 | 43 | 30 | 13.30 |
| 115 | 49 | 39 | 26 | 18.99 |
| 116 | 55 | 37 | 24 | 17.73 |
| 117 | 57 | 35 | 22 | 17.73 |

TABLE 9B

| Sample | CSH | TIPA | CS | NaSCN |
|---|---|---|---|---|
| 113 | 0 | 0 | 0 | 0 |
| 114 | 0.74 | 44.12 | 11.03 | 44.12 |
| 115 | 0.74 | 44.12 | 11.03 | 44.12 |
| 116 | 0.55 | 33.15 | 11.05 | 55.25 |
| 117 | 0.55 | 33.15 | 11.05 | 55.25 |

Table 9A shows a significant improvement in early and final compressive strengths of mortar compositions comprising the subject strength enhancing admixture, as compared to the same mortar composition having no admixture. For example, in Sample 114, an admixture comprising CSH, TIPA, CS and NaSCN was added to a cementitious composition, at a dosage of 13.30 oz/cwt, and resulted in a 52% 1-day increase, 43% 7-day increase, and a 30% 28-day increase in compressive strength of the cementitious material, as compared to Sample 113 which did not include an admixture.

Samples 118-158 were prepared using a blended mortar composition comprising Lehigh cement and fly ash to create mortar compositions with admixture dosages according to Table 10A. All the samples contained cement, fly ash, sand and water. In all of the samples, sand was present in an amount of 2,800 grams/batch, cement was present in an amount of 900 grams/batch, fly ash was present in an amount of 600 grams/batch, and water was present in an amount of 675 grams/batch. The water to cementitious material ratio of all the samples was 0.45, except Sample 120 was 0.42. Table 10B provides the percentage of each of the following admixture ingredients, based on the total dry weight of the admixture: CSH, TIPA, CS, VMA 362, VMA 358, NaSCN, Ca(NO$_3$)$_2$, Na$_2$SO$_4$ and silica fume. VMA 362 and VMA 358 are commercially available from BASF Corporation.

TABLE 10A

| Sample | 1-day (% increase) | 7-day (% increase) | 28-day (% increase) | Admixture Dosage (oz/cwt) |
|---|---|---|---|---|
| 118 | 0 | 0 | 0 | 0.00 |
| 119 | 24 | 39 | 19 | 6.78 |
| 120 | 46 | 34 | 26 | 8.26 |
| 121 | 21 | 35 | 19 | 8.29 |
| 122 | 27 | 29 | 21 | 8.62 |
| 123 | 27 | 38 | 21 | 8.66 |
| 124 | 26 | 36 | 25 | 8.66 |
| 125 | 19 | 36 | 23 | 8.79 |
| 126 | 34 | 32 | 31 | 8.80 |
| 127 | 22 | 36 | 24 | 9.75 |
| 128 | 26 | 43 | 21 | 10.23 |
| 129 | 28 | 31 | 23 | 10.31 |
| 130 | 10 | 32 | 20 | 10.84 |
| 131 | 30 | 24 | 28 | 11.05 |
| 132 | 38 | 32 | 29 | 11.12 |
| 133 | 30 | 35 | 23 | 11.25 |
| 134 | 31 | 24 | 18 | 11.88 |
| 135 | 32 | 27 | 25 | 12.07 |
| 136 | 35 | 22 | 21 | 12.09 |
| 137 | 26 | 27 | 15 | 12.34 |
| 138 | 35 | 28 | 23 | 12.56 |
| 139 | 2 | 31 | 17 | 12.79 |
| 140 | 28 | 19 | 21 | 12.92 |
| 141 | 33 | 24 | 24 | 12.99 |
| 142 | 38 | 27 | 24 | 13.02 |
| 143 | 31 | 26 | 12 | 13.57 |
| 144 | 23 | 27 | 15 | 13.70 |
| 145 | 28 | 30 | 18 | 13.84 |
| 146 | 36 | 29 | 18 | 13.93 |
| 147 | 13 | 36 | 20 | 14.15 |
| 148 | 22 | 26 | 15 | 14.42 |
| 149 | 39 | 31 | 23 | 14.53 |
| 150 | 37 | 34 | 35 | 14.81 |
| 151 | 12 | 38 | 20 | 15.15 |
| 152 | 34 | 39 | 19 | 15.28 |
| 153 | 2 | 30 | 18 | 15.41 |
| 154 | 35 | 28 | 25 | 15.48 |
| 155 | 8 | 37 | 22 | 15.83 |
| 156 | 2 | 32 | 17 | 16.09 |
| 157 | 15 | 22 | 14 | 16.69 |
| 158 | 18 | 27 | 13 | 17.86 |

TABLE 10B

| Sample | CSH | TIPA | CS | VMA362 | VMA358 | NaSCN | Ca(NO$_3$)$_2$ | Na$_2$SO$_4$ | Silica Fume |
|---|---|---|---|---|---|---|---|---|---|
| 118 | 0 | 0 | 0 | 0 | 0 | 0 | 0 | 0 | 0 |
| 119 | 0.83 | 16.58 | 8.29 | 0 | 1.33 | 39.80 | 0 | 0 | 33.17 |
| 120 | 2.45 | 24.51 | 12.25 | 0 | 1.96 | 58.82 | 0 | 0 | 0 |
| 121 | 5.03 | 25.13 | 12.56 | 0 | 2.01 | 50.25 | 0 | 5.03 | 0 |
| 122 | 4.78 | 23.92 | 11.96 | 0 | 1.91 | 57.42 | 0 | 0 | 0 |
| 123 | 0.69 | 13.83 | 6.92 | 0 | 1.11 | 49.79 | 0 | 0 | 27.66 |

TABLE 10B-continued

| Sample | CSH | TIPA | CS | VMA362 | VMA358 | NaSCN | Ca(NO$_3$)$_2$ | Na$_2$SO$_4$ | Silica Fume |
|---|---|---|---|---|---|---|---|---|---|
| 124 | 0.69 | 13.83 | 6.92 | 0 | 1.11 | 49.79 | 0 | 0 | 27.66 |
| 125 | 4.67 | 23.36 | 11.68 | 0 | 1.87 | 46.73 | 0 | 11.68 | 0 |
| 126 | 0.69 | 11.03 | 5.52 | 0 | 0 | 55.17 | 0 | 0 | 0 |
| 127 | 4.18 | 20.92 | 10.46 | 0 | 1.67 | 41.84 | 0 | 20.92 | 0 |
| 128 | 0.96 | 19.12 | 9.56 | 0 | 1.53 | 68.83 | 0 | 0 | 0 |
| 129 | 0.61 | 12.15 | 6.08 | 0 | 0.97 | 55.89 | 0 | 0 | 24.30 |
| 130 | 0.65 | 39.22 | 0 | 0 | 0 | 5.23 | 54.90 | 0 | 0 |
| 131 | 1.15 | 18.48 | 9.24 | 1.85 | 0 | 69.28 | 0 | 0 | 0 |
| 132 | 0.75 | 18.05 | 6.02 | 0 | 0 | 75.19 | 0 | 0 | 0 |
| 133 | 0.90 | 27.03 | 0 | 0 | 0 | 72.07 | 0 | 0 | 0 |
| 134 | 0.90 | 14.41 | 1.80 | 0 | 0 | 82.88 | 0 | 0 | 0 |
| 135 | 1.14 | 18.31 | 9.15 | 2.75 | 0 | 68.65 | 0 | 0 | 0 |
| 136 | 0.88 | 14.16 | 3.54 | 0 | 0 | 81.42 | 0 | 0 | 0 |
| 137 | 0.83 | 24.79 | 8.26 | 0 | 0 | 66.12 | 0 | 0 | 0 |
| 138 | 0.54 | 8.65 | 4.32 | 0 | 0 | 43.24 | 0 | 0 | 43.24 |
| 139 | 0.56 | 22.35 | 0 | 0 | 0 | 6.70 | 70.39 | 0 | 0 |
| 140 | 0.57 | 0 | 5.71 | 0 | 0 | 45.71 | 48.00 | 0 | 0 |
| 141 | 0.85 | 13.68 | 6.84 | 0 | 0 | 78.63 | 0 | 0 | 0 |
| 142 | 0.81 | 16.26 | 8.13 | 0 | 0 | 74.80 | 0 | 0 | 0 |
| 143 | 0.80 | 9.60 | 16.00 | 0 | 0 | 73.60 | 0 | 0 | 0 |
| 144 | 0.71 | 7.09 | 7.09 | 0 | 0 | 56.74 | 28.37 | 0 | 0 |
| 145 | 0.74 | 8.89 | 7.41 | 0 | 0 | 68.15 | 14.81 | 0 | 0 |
| 146 | 0.76 | 15.27 | 7.63 | 0 | 0 | 76.34 | 0 | 0 | 0 |
| 147 | 0.50 | 30.15 | 0 | 0 | 0 | 6.03 | 63.32 | 0 | 0 |
| 148 | 0.61 | 6.06 | 6.06 | 0 | 0 | 36.36 | 50.91 | 0 | 0 |
| 149 | 0.64 | 10.19 | 5.10 | 0 | 0 | 58.60 | 0 | 0 | 25.48 |
| 150 | 0.84 | 13.49 | 6.75 | 1.35 | 0 | 77.57 | 0 | 0 | 0 |
| 151 | 0.49 | 4.88 | 4.88 | 0 | 0 | 7.80 | 81.95 | 0 | 0 |
| 152 | 0.66 | 26.49 | 6.62 | 0 | 0 | 66.23 | 0 | 0 | 0 |
| 153 | 0.47 | 13.95 | 0 | 0 | 0 | 7.44 | 78.14 | 0 | 0 |
| 154 | 0.73 | 11.68 | 5.84 | 0 | 0 | 81.75 | 0 | 0 | 0 |
| 155 | 0.47 | 9.30 | 4.65 | 0 | 0 | 7.44 | 78.14 | 0 | 0 |
| 156 | 0.44 | 17.78 | 0 | 0 | 0 | 7.11 | 74.67 | 0 | 0 |
| 157 | 0.54 | 5.41 | 5.41 | 0 | 0 | 43.24 | 45.41 | 0 | 0 |
| 158 | 0.44 | 4.37 | 4.37 | 0 | 0 | 17.47 | 73.36 | 0 | 0 |

Table 10A shows a significant improvement in early and final compressive strengths of mortar compositions comprising the subject strength enhancing admixture, as compared to the same mortar composition having no admixture.

In Sample 130, an admixture comprising CSH, TIPA, NaSCN and Ca(NO$_3$)$_2$ was added to a cementitious composition, at a dosage of 10.84 oz/cwt, and resulted in a 10% 1-day increase, a 32% 7-day increase, and a 20% 28-day increase in compressive strength of the cementitious material, as compared to Sample 118 which did not include an admixture. In Sample 129, an admixture comprising CSH, TIPA, CS, VMA 358, NaSCN and silica fume was added to the same cementitious material as Sample 130, at a dosage of 10.31% oz/cwt, and resulted in a 28% 1-day increase, 31% 7-day increase, and a 23% 28-day increase, as compared to Sample 118 which did not include an admixture.

In Sample 156, an admixture comprising CSH, TIPA, NaSCN and Ca(NO$_3$)$_2$ was added to a cementitious composition, at a dosage of 16.09 oz/cwt, and resulted in a 2% 1-day increase, a 32% 7-day increase, and a 17% 28-day increase in compressive strength of the cementitious material, as compared to Sample 118 which did not include an admixture.

In Sample 155, an admixture comprising CSH, TIPA, CS, NaSCN and Ca(NO$_3$)$_2$ was added to the same cementitious material as Sample 156, at a dosage of 15.83% oz/cwt, and resulted in an 8% 1-day increase, 37% 7-day increase, and a 17% 28-day increase, as compared to Sample 118 which did not include an admixture.

Samples 159-163 were prepared using a blended mortar composition comprising Lehigh cement and fly ash to create mortar compositions with admixture dosages according to Table 11A. In Samples 159-163, sand was present in an amount of 2,800 grams/batch, cement was present in an amount of 900 grams/batch, fly ash was present in an amount of 600 grams/batch, and water was present in an amount of 570 grams/batch. The water to cementitious material ratio of all the samples was 0.38. Table 11B provides the percentage of each of the following admixture ingredients, based on the total dry weight of the admixture: CSH, TIPA, NaSCN and Ca(NO$_3$)$_2$.

TABLE 11A

| Sample | 1-day (% increase) | 7-day (% increase) | 28-day (% increase) | Admixture Dosage (oz/cwt) |
|---|---|---|---|---|
| 159 | 0 | 0 | 0 | 0.00 |
| 160 | 20 | 10 | 8 | 32.78 |
| 161 | 27 | 8 | 7 | 40.34 |
| 162 | 35 | 18 | 14 | 44.60 |
| 163 | 39 | 6 | 6 | 45.26 |

TABLE 11B

| Sample | CSH | TIPA | NaSCN | Ca(NO$_3$)$_2$ |
|---|---|---|---|---|
| 159 | 0 | 0 | 0 | 0 |
| 160 | 32.89 | 0 | 34.21 | 32.89 |
| 161 | 32.89 | 0 | 67.11 | 0 |
| 162 | 28.25 | 14.12 | 57.63 | 0 |
| 163 | 65.79 | 0 | 34.21 | 0 |

Table 11A shows a significant improvement in early and final compressive strengths of mortar compositions comprising the subject strength enhancing admixture, as compared to the same mortar composition having no admixture. In Sample 161, an admixture comprising CSH and NaSCN was added to a cementitious composition, at a dosage of 40.34 oz/cwt, and resulted in a 27% 1-day increase, a 8% 7-day increase, and a 7% 28-day increase in compressive strength of the cementitious material, as compared to Sample 159 which did not include an admixture. In Sample 162, an admixture comprising CSH, TIPA and NaSCN was added to the same cementitious material as Sample 161, at a dosage of 44.60% oz/cwt, and resulted in a 35% 1-day increase, 18% 7-day increase, and a 14% 28-day increase, as compared to Sample 159 which did not include an admixture.

Samples 164-197 were prepared using a mortar composition comprising Lehigh cement to create mortar compositions with admixture dosages according to Table 12A. All the samples contained cement, sand and water. In all of the samples, sand was present in an amount of 2,800 grams/batch; cement was present in an amount of 1310 grams/batch, except for Sample 164, which had 1450 grams/batch cement; and water was present in an amount of 707 grams/batch, except for Sample 164, which had 754 grams/batch water. The water to cementitious material ratio of all the samples was 0.54, except Sample 164 was 0.52. Table 12B provides the percentage of each of the following admixture ingredients, based on the total dry weight of the admixture: CSH, TIPA, triethanolamine ("TEA"), diisopropanolamine ("DIPA"), CS, VMA 362, NaSCN, $Ca(NO_3)_2$, $Al_2(SO_4)_3$, calciumnitrite and colloidal silica.

TABLE 12A

| Sample | 1-day (% increase) | 7-day (% increase) | 28-day (% increase) | Admixture Dosage (oz/cwt) |
|---|---|---|---|---|
| 164 | 0 | 0 | 0 | 0.00 |
| 165 | 32 | 24 | 9 | 6.65 |
| 166 | 33 | 20 | 7 | 6.68 |
| 167 | 29 | 21 | 3 | 6.71 |
| 168 | 21 | 31 | 33 | 8.10 |
| 169 | 33 | 26 | 9 | 8.58 |
| 170 | 28 | 22 | 7 | 8.69 |
| 171 | 40 | 26 | 10 | 9.09 |
| 172 | 27 | 19 | 21 | 10.00 |
| 173 | 26 | 3 | 7 | 10.00 |
| 174 | 34 | 2 | 12 | 10.00 |
| 175 | 40 | 26 | 27 | 10.00 |
| 176 | 17 | 11 | 23 | 10.00 |
| 177 | 23 | 21 | 16 | 10.00 |
| 178 | 41 | 23 | 27 | 10.00 |
| 179 | 31 | 15 | 25 | 10.00 |
| 180 | 27 | 24 | 23 | 10.00 |
| 181 | 31 | 36 | 33 | 10.00 |
| 182 | 26 | 20 | 12 | 10.00 |
| 183 | 55 | 15 | 12 | 10.00 |
| 184 | 21 | 27 | 27 | 10.00 |
| 185 | 28 | 25 | 25 | 10.00 |
| 186 | 45 | 30 | 24 | 10.00 |
| 187 | 51 | 38 | 29 | 10.00 |
| 188 | 47 | 34 | 32 | 10.00 |
| 189 | 51 | 36 | 30 | 10.00 |
| 190 | 34 | 32 | 26 | 10.00 |
| 191 | 33 | 31 | 27 | 10.00 |
| 192 | 32 | 6 | 8 | 10.00 |
| 193 | 38 | 27 | 8 | 10.44 |
| 194 | 41 | 22 | 11 | 10.95 |
| 195 | 38 | 18 | 7 | 11.99 |
| 196 | 34 | 23 | 9 | 12.02 |
| 197 | 34 | 24 | 13 | 14.66 |

TABLE 12B

| Sample | CSH | TIPA | TEA | DIPA | CS | VMA362 | NaSCN | $Ca(NO_3)_2$ | $Al_2(SO_4)_3$ | $Ca(NO_2)_2$ | Colloidal Silica |
|---|---|---|---|---|---|---|---|---|---|---|---|
| 164 | 0 | 0 | 0 | 0 | 0 | 0 | 0 | 0 | 0 | 0 | 0 |
| 165 | 1.24 | 24.81 | 0 | 0 | 12.41 | 1.99 | 59.55 | 0 | 0 | 0 | 0 |
| 166 | 0.94 | 15.01 | 0 | 0 | 7.50 | 1.50 | 75.50 | 0 | 0 | 0 | 0 |
| 167 | 0.84 | 13.49 | 0 | 0 | 6.75 | 1.35 | 77.57 | 0 | 0 | 0 | 0 |
| 168 | 7.10 | 17.75 | 0 | 0 | 8.88 | 0 | 0 | 0 | 0 | 0 | 66.27 |
| 169 | 1.24 | 24.81 | 0 | 0 | 12.41 | 1.99 | 59.55 | 0 | 0 | 0 | 0 |
| 170 | 23.67 | 29.59 | 0 | 0 | 14.79 | 2.37 | 29.59 | 0 | 0 | 0 | 0 |
| 171 | 10.05 | 25.13 | 0 | 0 | 12.56 | 2.01 | 50.25 | 0 | 0 | 0 | 0 |
| 172 | 10.26 | 25.64 | 0 | 0 | 12.82 | 0 | 51.28 | 0 | 0 | 0 | 0 |
| 173 | 13.79 | 0 | 0 | 0 | 17.24 | 0 | 68.97 | 0 | 0 | 0 | 0 |
| 174 | 13.29 | 3.63 | 0 | 0 | 16.62 | 0 | 66.46 | 0 | 0 | 0 | 0 |
| 175 | 8.07 | 41.47 | 0 | 0 | 10.09 | 0 | 40.37 | 0 | 0 | 0 | 0 |
| 176 | 21.05 | 52.63 | 0 | 0 | 26.32 | 0 | 0 | 0 | 0 | 0 | 0 |
| 177 | 19.38 | 48.45 | 0 | 0 | 24.23 | 0 | 7.94 | 0 | 0 | 0 | 0 |
| 178 | 7.89 | 19.73 | 0 | 0 | 9.87 | 0 | 62.51 | 0 | 0 | 0 | 0 |
| 179 | 11.76 | 29.41 | 0 | 0 | 0 | 0 | 58.82 | 0 | 0 | 0 | 0 |
| 180 | 11.58 | 28.95 | 0 | 0 | 1.58 | 0 | 57.89 | 0 | 0 | 0 | 0 |
| 181 | 9.36 | 24.08 | 0 | 0 | 18.14 | 0 | 48.15 | 0 | 0 | 0 | 0 |
| 182 | 10.26 | 25.64 | 0 | 0 | 12.82 | 0 | 51.28 | 0 | 0 | 0 | 0 |
| 183 | 10.26 | 0 | 25.64 | 0 | 12.82 | 0 | 51.28 | 0 | 0 | 0 | 0 |
| 184 | 10.26 | 25.64 | 0 | 0 | 12.82 | 0 | 0 | 51.28 | 0 | 0 | 0 |
| 185 | 10.26 | 25.64 | 0 | 0 | 12.82 | 0 | 0 | 0 | 51.28 | 0 | 0 |
| 186 | 9.63 | 24.08 | 0 | 0 | 18.14 | 0 | 48.15 | 0 | 0 | 0 | 0 |
| 187 | 8.91 | 22.26 | 0 | 0 | 24.30 | 0 | 44.53 | 0 | 0 | 0 | 0 |
| 188 | 10.26 | 25.64 | 0 | 0 | 0 | 0 | 51.28 | 0 | 0 | 0 | 0 |
| 189 | 10.26 | 25.64 | 0 | 0 | 0 | 0 | 51.28 | 0 | 0 | 0 | 0 |
| 190 | 10.15 | 25.38 | 0 | 0 | 12.69 | 1.02 | 50.76 | 0 | 0 | 0 | 0 |
| 191 | 10.05 | 25.13 | 0 | 0 | 12.56 | 2.01 | 50.25 | 0 | 0 | 0 | 0 |
| 192 | 10.26 | 0 | 0 | 25.64 | 12.82 | 0 | 51.28 | 0 | 0 | 0 | 0 |
| 193 | 18.26 | 22.83 | 0 | 0 | 11.42 | 1.83 | 45.66 | 0 | 0 | 0 | 0 |
| 194 | 0.94 | 15.01 | 0 | 0 | 7.50 | 1.50 | 75.05 | 0 | 0 | 0 | 0 |
| 195 | 0.84 | 13.49 | 0 | 0 | 6.75 | 1.35 | 77.57 | 0 | 0 | 0 | 0 |

TABLE 12B-continued

| Sample | CSH | TIPA | TEA | DIPA | CS | VMA362 | NaSCN | Ca(NO$_3$)$_2$ | Al$_2$(SO$_4$)$_3$ | Ca(NO$_2$)$_2$ | Colloidal Silica |
|---|---|---|---|---|---|---|---|---|---|---|---|
| 196 | 0.76 | 15.17 | 0 | 0 | 7.58 | 1.21 | 36.40 | 0 | 38.88 | 0 | 0 |
| 197 | 0.63 | 12.70 | 0 | 0 | 6.35 | 1.20 | 30.47 | 0 | 48.83 | 0 | 0 |

Sample 188 also contained sugar in an amount of 12.82%. Sample 189 also contained molasses in an amount of 12.83%

Table 12A shows a significant improvement in early and final compressive strengths of mortar compositions comprising the subject strength enhancing admixture, as compared to the same mortar composition having no admixture. For example, in Sample 165, an admixture comprising CSH, TIPA, CS, VMA 362, and NaSCN was added to a cementitious composition, at a dosage of 6.65 oz/cwt, and resulted in a 32% 1-day increase, 24% 7-day increase, and a 9% 28-day increase in compressive strength of the cementitious material, as compared to Sample 164 which did not include an admixture.

In Sample 173, an admixture comprising CSH, CS and NaSCN was added to a cementitious composition, at a dosage of 10.00 oz/cwt, and resulted in a 26% 1-day increase, a 3% 7-day increase, and a 7% 28-day increase in compressive strength of the cementitious material, as compared to Sample 164 which did not include an admixture. In Sample 172, an admixture comprising CSH, TIPA, CS and NaSCN was added to the same cementitious material as Sample 173, at a dosage of 10.00% oz/cwt, and resulted in a 27% 1-day increase, 19% 7-day increase, and a 21% 28-day increase, as compared to Sample 164 which did not include an admixture.

Samples 198-209 were prepared using a mortar composition comprising Lehigh, Hercules or Richmond cement to create mortar compositions with admixture dosages according to Table 13A. All the samples contained cement, sand and water. In all of the samples, sand was present in an amount of 2,800 grams/batch; cement was present in an amount of 1,310 grams/batch, except for Samples 198 and 199, which had 1,450 grams/batch of cement; and water was present in an amount of 734 grams/batch, except for Samples 198 and 199, which had 754 grams/batch water. The water to cementitious material ratio of all the samples was 0.56, except Samples 198 and 199, which had ratios of 0.52. Table 13B provides the percentage of each of the following admixture ingredients, based on the total dry weight of the admixture: CSH, TIPA, CS, VMA 362 and NaSCN.

TABLE 13A

| Sample | 1-day (% increase) | 7-day (% increase) | 28-day (% increase) | Cement type | Admixture Dosage (oz/cwt) |
|---|---|---|---|---|---|
| 198 | 0 | 0 | 0 | Hercules | 0.00 |
| 199 | 0 | 0 | 0 | Richmond | 0.00 |
| 200 | 3 | 23 | 5 | Lehigh | 6.63 |
| 201 | 1 | 18 | 16 | Hercules | 6.63 |
| 202 | 7 | 24 | 19 | Hercules | 6.68 |
| 203 | 11 | 19 | 13 | Richmond | 6.68 |
| 204 | 11 | 20 | 8 | Lehigh | 6.69 |
| 205 | 16 | 18 | 16 | Richmond | 6.69 |
| 206 | −1 | 21 | 15 | Hercules | 6.70 |
| 207 | 8 | 21 | 7 | Lehigh | 6.70 |
| 208 | 19 | 18 | 16 | Richmond | 6.70 |
| 209 | 9 | 22 | 7 | Lehigh | 6.72 |

TABLE 13B

| Sample | CSH | TIPA | CS | VMA362 | NaSCN |
|---|---|---|---|---|---|
| 198 | 0 | 0 | 0 | 0 | 0 |
| 199 | 0 | 0 | 0 | 0 | 0 |
| 200 | 20.71 | 29.59 | 14.79 | 2.37 | 32.54 |
| 201 | 1.24 | 24.81 | 12.41 | 1.99 | 59.55 |
| 202 | 0.94 | 15.01 | 7.50 | 1.50 | 75.05 |
| 203 | 0.94 | 15.01 | 7.50 | 1.50 | 75.05 |
| 204 | 1.24 | 24.81 | 12.41 | 1.99 | 59.55 |
| 205 | 1.24 | 24.81 | 12.41 | 1.99 | 59.55 |
| 206 | 10.87 | 27.17 | 13.59 | 2.17 | 46.20 |
| 207 | 10.87 | 27.17 | 13.59 | 2.17 | 46.20 |
| 208 | 10.87 | 27.17 | 13.59 | 2.17 | 46.20 |
| 209 | 5.15 | 25.77 | 12.89 | 2.06 | 54.12 |

Table 13 shows a significant improvement in early and final compressive strengths of mortar compositions comprising the subject strength enhancing admixture, as compared to similar mortar compositions having no admixture.

In Sample 201, an admixture comprising CSH, TIPA, CS, VMA 362 and NaSCN was added to a Hercules cementitious composition, at a dosage of 6.63 oz/cwt, and resulted in a 1% 1-day increase, a 18% 7-day increase, and a 16% 28-day increase in compressive strength of the cementitious material, as compared to Sample 198 which did not include an admixture.

In Sample 203, an admixture comprising CSH, TIPA, CS, VMA 362 and NaSCN was added to a Richmond cementitious composition, at a dosage of 6.68 oz/cwt, and resulted in a 11% 1-day increase, a 19% 7-day increase, and a 13% 28-day increase in compressive strength of the cementitious material, as compared to Sample 199 which did not include an admixture.

Samples 210-216 were prepared using a mortar composition comprising Lehigh cement to create mortar compositions with admixture dosages according to Table 14A. All the samples contained cement, sand and water. In all of the samples, sand was present in an amount of 3,000 grams/batch, except Sample 210 which contained 2800 grams/batch sand; cement was present in an amount of 1,282 grams/batch, except for Sample 210, which contained 1,301 grams/batch cement; and water in an amount of 744 grams/batch, except for Sample 210, which contained 707 grams/batch water. The water to cementitious material proportion of all the samples was 0.58, except Sample 210, which had a ratio of 0.54. Table 14B provides the percentage of each of the following admixture ingredients, based on the total dry weight of the admixture: CSH, TIPA, TEA, CS, molasses and NaSCN.

TABLE 14A

| Sample | 1-day (% increase) | 7-day (% increase) | 28-day (% increase) | Admixture Dosage (oz/cwt) |
|---|---|---|---|---|
| 210 | 0 | 0 | 0 | 0.00 |
| 211 | 18 | 15 | 11 | 5.42 |
| 212 | 16 | 13 | 13 | 5.79 |
| 213 | 14 | 10 | 8 | 6.99 |
| 214 | 23 | 15 | 10 | 7.64 |
| 215 | 15 | 15 | 16 | 7.73 |
| 216 | 12 | 13 | 18 | 9.02 |

TABLE 14B

| Sample | CSH | TIPA | TEA | CS | Molasses | NaSCN |
|---|---|---|---|---|---|---|
| 210 | 0 | 0 | 0 | 0 | 0 | 0 |
| 211 | 8.29 | 10.36 | 10.36 | 0 | 29.83 | 41.16 |
| 212 | 8.16 | 20.41 | 0 | 30.61 | 0 | 40.82 |
| 213 | 9.71 | 24.27 | 0 | 0 | 17.48 | 48.54 |
| 214 | 8.26 | 20.66 | 0 | 0 | 29.75 | 41.32 |
| 215 | 9.32 | 23.31 | 0 | 20.75 | 0 | 46.62 |
| 216 | 6.37 | 15.92 | 0 | 0 | 45.86 | 31.85 |

Table 14 shows a significant improvement in early and final compressive strengths of mortar compositions comprising the subject strength enhancing admixture, as compared to a similar mortar composition having no admixture.

Samples 217-222 were prepared using a blended mortar composition comprising Lehigh cement and fly ash to create mortar compositions with admixture dosages according to Table 15A. All the samples contained cement, fly ash, sand and water. In all of the samples, sand was present in an amount of 2,500 grams/batch, cement and fly ash were present in an amount of 770 grams/batch each, and water was present in an amount of 616 grams/batch. The water to cementitious material ratio of all the samples was 0.40. Table 15B provides the percentage of each of the following admixture ingredients, based on the total dry weight of the admixture: CSH, TIPA, CS and NaSCN.

TABLE 15A

| Sample | 1-day (% increase) | 7-day (% increase) | 28-day (% increase) | Admixture Dosage (oz/cwt) |
|---|---|---|---|---|
| 217 | 0 | 0 | 0 | 0.00 |
| 218 | −2 | −6 | −1 | 12.80 |
| 219 | 5 | 10 | 8 | 11.42 |
| 220 | 14 | 6 | 1 | 25.70 |
| 221 | 38 | 11 | 3 | 26.84 |
| 222 | 53 | 25 | 14 | 27.29 |

TABLE 15B

| Sample | CSH | TIPA | CS | NaSCN |
|---|---|---|---|---|
| 217 | 0 | 0 | 0 | 0 |
| 218 | 100 | 0 | 0 | 0 |
| 219 | 79.59 | 20.41 | 0 | 0 |
| 220 | 100 | 0 | 0 | 0 |
| 221 | 72.22 | 0 | 9.26 | 18.52 |
| 222 | 69.03 | 4.42 | 8.85 | 17.70 |

Table 15A shows a significant improvement in early and final compressive strengths of in mortar compositions comprising the subject strength enhancing admixture, as compared to the same mortar composition having no admixture.

The results show that the strength enhancing admixture comprising calcium silicate hydrate and at least one of: i) at least one alkanolamine; ii) at least one inorganic accelerator; or iii) at least one carbohydrate provided a significantly higher strengthening effect, as compared to a single mortar mixture having no admixture. For example, in Sample 218, an admixture comprising 100% CSH was added to a cementitious material, at a dosage of 12.80 oz/cwt, and resulted in a 2% 1-day decrease, a 6% 7-day decrease, and a 1% 28-day decrease in compressive strength of the cementitious material, as compared to Sample 217 which did not include an admixture. In Sample 219, an admixture comprising CSH and TIPA was added to the same cementitious composition, at a dosage of 11.42 oz/cwt, and resulted in a 5% 1-day increase, a 10% 7-day increase, and a 8% 28-day increase in compressive strength of the cementitious material, as compared to Sample 217 which did not include an admixture.

In Sample 220, an admixture comprising 100% CSH was added to a cementitious material, at a dosage of 25.70 oz/cwt, and resulted in a 14% 1-day increase, a 6% 7-day increase, and a 1% 28-day increase in compressive strength of the cementitious material, as compared to Sample 217 which did not include an admixture. In Sample 221, an admixture comprising CSH, CS and NaSCN was added to the same cementitious composition, at a dosage of 26.84 oz/cwt, and resulted in a 38% 1-day increase, a 11% 7-day increase, and a 3% 28-day increase in compressive strength of the cementitious material, as compared to Sample 217 which did not include an admixture. In Sample 222, an admixture comprising CSH, TIPA, CS and NaSCN was added to the same cementitious composition, at a dosage of 27.29 oz/cwt, and resulted in a 53% 1-day increase, a 25% 7-day increase, and a 14% 28-day increase in compressive strength of the cementitious material, as compared to Sample 217 which did not include an admixture. This observed level of performance demonstrates a synergistic effect of calcium silicate hydrate and at least one of: i) at least one alkanolamine; ii) at least one inorganic accelerator; or iii) at least one carbohydrate.

Samples 223-226 were prepared using a mortar composition comprising Lehigh cement to create mortar compositions with admixture dosages according to Table 16A. In Samples 223-226, sand was present in an amount of 2,800 grams/batch, cement was present in an amount of 1,310 grams/batch, and water was present in an amount of 707 grams/batch. The water to cementitious material ratio of all the samples was 0.54. Table 16B provides the percentage of each of the following admixture ingredients, based on the total dry weight of the admixture: CSH, TIPA, TEA, DIPA, CS and NaSCN.

TABLE 16A

| Sample | 1-day (% increase) | 7-day (% increase) | 28-day (% increase) | Admixture Dosage (oz/cwt) |
|---|---|---|---|---|
| 223 | 0 | 0 | 0 | 0.00 |
| 224 | 26 | 20 | 12 | 10.00 |
| 225 | 55 | 15 | 12 | 10.00 |
| 226 | 32 | 6 | 8 | 10.00 |

TABLE 16B

| Sample | CSH | TIPA | TEA | DIPA | CS | NaSCN |
|---|---|---|---|---|---|---|
| 223 | 0 | 0 | 0 | 0 | 0 | 0 |
| 224 | 10.26 | 25.64 | 0 | 0 | 12.82 | 51.28 |
| 225 | 10.26 | 0 | 25.64 | 0 | 12.82 | 51.28 |
| 226 | 10.26 | 0 | 0 | 25.64 | 12.82 | 51.28 |

The three different types of alkanolamines in Table 16 (i.e., TIPA, TEA and DIPA) establish a trend showing that the addition of an alkanolamine to calcium silicate hydrate provides a similar increased strengthening effect, as compared to an admixture containing calcium silicate hydrate alone.

Samples 227-230 were prepared using a mortar composition comprising Lehigh cement to create mortar compositions with admixture dosages according to Table 17A. In Samples 227-230, sand was present in an amount of 2,800 grams/batch, cement was present in an amount of 1,310 grams/batch, and water was present in an amount of 707 grams/batch. The water to cementitious material ratio of all the samples was 0.54. Table 17B provides the percentage of each of the following admixture ingredients, based on the total dry weight of the admixture: CSH, TIPA, CS, Sugar, Molasses and NaSCN.

TABLE 17A

| Sample | 1-day (% increase) | 7-day (% increase) | 28-day (% increase) | Admixture Dosage (oz/cwt) |
|---|---|---|---|---|
| 227 | 0 | 0 | 0 | 0.00 |
| 228 | 26 | 20 | 12 | 10.00 |
| 229 | 47 | 34 | 32 | 10.00 |
| 230 | 51 | 36 | 30 | 10.00 |

TABLE 17B

| Sample | CSH | TIPA | CS | Sugar | Molasses | NaSCN |
|---|---|---|---|---|---|---|
| 227 | 0 | 0 | 0 | 0 | 0 | 0 |
| 228 | 10.25 | 25.64 | 12.82 | 0 | 0 | 51.28 |
| 229 | 10.25 | 25.64 | 0 | 12.82 | 0 | 51.28 |
| 230 | 10.25 | 25.64 | 0 | 0 | 12.82 | 51.28 |

The three different types of carbohydrates in Table 17 (i.e., corn syrup, sugar and molasses) establish a trend showing that the addition of a carbohydrate to calcium silicate hydrate provides a similar increased strengthening effect, as compared to an admixture containing calcium silicate hydrate alone.

Samples 231-235 were prepared using a mortar composition comprising Lehigh cement to create mortar compositions with admixture dosages according to Table 18A. In Samples 231-235, sand was present in an amount of 2,800 grams/batch, cement was present in an amount of 1,310 grams/batch, and water was present in an amount of 707 grams/batch. The water to cementitious material proportion of all the samples was 0.54. Table 18B provides the percentage of each of the following admixture ingredients, based on the total dry weight of the admixture: CSH, TIPA, CS, NaSCN, Ca(NO$_3$)$_2$, calcium nitrite and colloidal silica.

TABLE 18A

| Sample | 1-day (% increase) | 7-day (% increase) | 28-day (% increase) | Admixture Dosage (oz/cwt) |
|---|---|---|---|---|
| 231 | 0 | 0 | 0 | 0.00 |
| 232 | 26 | 20 | 12 | 10.00 |
| 233 | 21 | 27 | 27 | 10.00 |
| 234 | 28 | 25 | 25 | 10.00 |
| 235 | 21 | 31 | 33 | 8.10 |

TABLE 18B

| Sample | CSH | TIPA | CS | NaSCN | Ca(NO$_3$)$_2$ | Ca(NO$_2$)$_2$ | Colloidal silica |
|---|---|---|---|---|---|---|---|
| 231 | 0 | 0 | 0 | 0 | 0 | 0 | 0 |
| 232 | 10.26 | 25.64 | 12.82 | 51.29 | 0 | 0 | 0 |
| 233 | 10.26 | 25.64 | 12.82 | 0 | 51.29 | 0 | 0 |
| 234 | 10.26 | 25.64 | 12.82 | 0 | 0 | 51.29 | 0 |
| 235 | 7.10 | 17.75 | 8.88 | 0 | 0 | 0 | 66.27 |

The four different types of inorganic accelerators in Table 18 (i.e., sodium thiocyanate, calcium nitrate, calcium nitrite, and colloidal silica) establish a trend showing that the addition of an inorganic accelerator to calcium silicate hydrate provides a similar increased strengthening effect, as compared to an admixture containing calcium silicate hydrate alone.

Samples 236-239 were prepared using a concrete composition comprising Lehigh cement to create concrete compositions with admixture dosages according to Table 19A. In Samples 236-239, sand was present in an amount of 1,427 lb/yd$^3$, except for Sample 236, which contained 1,432 lb/yd$^3$ sand; cement was present in an amount of 517 lb/yd$^3$, #8 coarse aggregate was present in an amount of 1,891 lb/yd$^3$, and water was present in an amount of 269 lb/yd$^3$. The water to cementitious material ratio of all the samples was 0.52. Table 19B provides the percentage of each of the following admixture ingredients, based on the total dry weight of the admixture: CSH, TIPA, CS, VMA 362 and NaSCN.

TABLE 19A

| Sample | 1-day (% increase) | 7-day (% increase) | 28-day (% increase) | Superplasticizer | Admixture Dosage (oz/cwt) |
|---|---|---|---|---|---|
| 236 | 0 | 0 | 0 | 0 | 0 |
| 237 | 14 | 8 | 12 | 5.29 | 6.50 |
| 238 | 16 | 6 | 12 | 5.15 | 6.50 |
| 239 | 13 | 5 | 10 | 3.97 | 6.50 |

TABLE 19B

| Sample | CSH | TIPA | CS | VMA362 | NaSCN |
|---|---|---|---|---|---|
| 236 | 0 | 0 | 0 | 0 | 0 |
| 237 | 1.24 | 24.81 | 12.41 | 1.99 | 59.55 |
| 238 | 10.05 | 25.13 | 12.56 | 2.01 | 50.25 |
| 239 | 0.94 | 15.01 | 7.50 | 1.50 | 75.05 |

Table 19 shows a significant improvement in early and final compressive strengths of concrete compositions comprising the subject strength enhancing admixture, as compared to the same concrete composition having no admixture, even considering the higher water-to-cement ratios of these Samples as compared to other Samples presented herein.

Samples 240-243 were prepared using a concrete composition comprising Victor cement to create concrete compositions with admixture dosages according to Table 20A. In Samples 240-243, sand was present in an amount of 1,375 lb/yd$^3$, except for Sample 240, which contained 1,380 lb/yd$^3$ sand; cement was present in an amount of 517 lb/yd$^3$, #8 coarse aggregate was present in an amount of 851 lb/yd$^3$, #57 coarse aggregate was present in an amount of 1,040 lb/yd$^3$, and water was present in an amount of 279 lb/yd$^3$. The water to cementitious material ratio of all the samples was 0.54. Table 20B provides the percentage of each of the following admixture ingredients, based on the total dry weight of the admixture: CSH, TIPA, CS, VMA 362 and NaSCN.

TABLE 20A

| Sample | 1-day (% increase) | 7-day (% increase) | 28-day (% increase) | Super-plasticizer | Admixture Dosage (oz/cwt) |
|---|---|---|---|---|---|
| 240 | 0 | 0 | 0 | 1.47 | 0 |
| 241 | 18 | 16 | 16 | 1.18 | 6.00 |
| 242 | 35 | 30 | 31 | 1.47 | 6.00 |
| 243 | 21 | 17 | 19 | 1.18 | 6.00 |

TABLE 20B

| Sample | CSH | TIPA | CS | VMA362 | NaSCN |
|---|---|---|---|---|---|
| 240 | 0 | 0 | 0 | 0 | 0 |
| 241 | 1.24 | 24.81 | 12.41 | 1.99 | 59.55 |
| 242 | 10.05 | 25.13 | 12.56 | 2.01 | 50.25 |
| 243 | 0.94 | 15.01 | 7.50 | 1.50 | 75.05 |

Table 20 shows a significant improvement in early and final compressive strengths of concrete compositions comprising the subject strength enhancing admixture, as compared to the same concrete composition having no admixture, even considering the higher water-to-cement ratios of these Samples as compared to other Samples presented herein.

Samples 244-247 were prepared using a concrete composition comprising Hercules cement to create concrete compositions with admixture dosages according to Table 21A. In Samples 244-247, sand was present in an amount of 1,348 lb/yd$^3$, except for Sample 244 which contained 1,353 lb/yd$^3$ sand; cement was present in an amount of 517 lb/yd$^3$, #8 coarse aggregate was present in an amount of 851 lb/yd$^3$, #57 coarse aggregate was present in an amount of 1,040 lb/yd$^3$, and water was present in an amount of 290 lb/yd$^3$. The water to cementitious material ratio of all the samples was 0.56. Table 21B provides the percentage of each of the following admixture ingredients, based on the total dry weight of the admixture: CSH, TIPA, CS, VMA 362 and NaSCN.

TABLE 21A

| Sample | 1-day (% increase) | 7-day (% increase) | 28-day (% increase) | Super-plasticizer | Admixture Dosage (oz/cwt) |
|---|---|---|---|---|---|
| 244 | 0 | 0 | 0 | 0.5 | 0 |
| 245 | 14 | 3 | 8 | 0 | 6.00 |
| 246 | 12 | 5 | 4 | 0 | 6.00 |
| 247 | 12 | 8 | 7 | 0 | 6.00 |

TABLE 21B

| Sample | CSH | TIPA | CS | VMA362 | NaSCN |
|---|---|---|---|---|---|
| 244 | 0 | 0 | 0 | 0 | 0 |
| 245 | 1.24 | 24.81 | 12.41 | 1.99 | 59.55 |
| 246 | 10.05 | 25.13 | 12.56 | 2.01 | 50.25 |
| 247 | 0.94 | 15.01 | 7.50 | 1.50 | 75.05 |

Table 21 shows a significant improvement in early and final compressive strengths of concrete compositions comprising the subject strength enhancing admixture, as compared to the same concrete composition having no admixture, even considering the higher water-to-cement ratios of these Samples as compared to other Samples presented herein.

Samples 248-255 were prepared using a concrete composition comprising Lehigh cement to create concrete compositions with admixture dosages according to Table 22A. All the samples contained cement, aggregate, sand and water. In all of the samples, sand was present in an amount of 1,440 lb/yd$^3$, except for Sample 248, which contained 1,346 lb/yd$^3$ sand; cement was present in an amount of 452 lb/yd$^3$, except for Sample 248, which contained 517 lb/yd$^3$ cement; #8 coarse aggregate was present in an amount of 861 lb/yd$^3$, except for Sample 248, which contained 851 lb/yd$^3$ #8 coarse aggregate; #57 coarse aggregate was present in an amount of 1,052 lb/yd$^3$, except for Sample 248, which contained 1,040 lb/yd$^3$ #57 coarse aggregate; and water was present in an amount of 264 lb/yd$^3$, except for Sample 248, which contained 290 lb/yd$^3$ water. The water to cementitious material proportion of all the samples was 0.585, except for Sample 248, which had a ratio of 0.56. Table 22B provides the percentage of each of the following admixture ingredients, based on the total dry weight of the admixture: CSH, TIPA, TEA, CS, molasses and NaSCN.

TABLE 22A

| Sample | 1-day (% increase) | 7-day (% increase) | 28-day (% increase) | Super-plasticizer | Admixture Dosage (oz/cwt) |
|---|---|---|---|---|---|
| 248 | 0 | 0 | 0 | 0 | 0 |
| 249 | 9 | 8 | 6 | 0.50 | 5.50 |
| 250 | 2 | 6 | 3 | 0 | 5.50 |
| 251 | −1 | 5 | 9 | 0 | 5.50 |
| 252 | 7 | 9 | 8 | 0.65 | 5.50 |
| 253 | 17 | 6 | 1 | 0.85 | 5.50 |
| 254 | 19 | 0 | −7 | 0.50 | 5.50 |
| 255 | 19 | 3 | −3 | 0.75 | 5.50 |

TABLE 22B

| Sample | CSH | TIPA | TEA | CS | Molasses | NaSCN |
|---|---|---|---|---|---|---|
| 248 | 0 | 0 | 0 | 0 | 0 | 0 |
| 249 | 9.32 | 23.71 | 0 | 20.75 | 0 | 46.62 |
| 250 | 21.05 | 17.54 | 0 | 26.32 | 0 | 35.09 |
| 251 | 8.26 | 20.65 | 0 | 0 | 29.75 | 41.32 |
| 252 | 16.95 | 14.12 | 0 | 0 | 40.68 | 28.25 |
| 253 | 8.16 | 10.20 | 10.20 | 30.61 | 0 | 40.82 |
| 254 | 8.16 | 0 | 20.41 | 30.61 | 0 | 40.82 |
| 255 | 8.70 | 0 | 15.22 | 32.61 | 0 | 43.48 |

Table 22 shows a significant improvement in early and final compressive strengths of concrete compositions comprising the subject strength enhancing admixture, as compared to a similar concrete composition having no admixture, even considering the higher water-to-cement ratios of Samples 249-255 as compared to Sample 248.

Samples 256-263 were prepared using a concrete composition comprising Hercules cement to create concrete compositions with admixture dosages according to Table 23A. In all of the samples, sand was present in an amount of 1,440 lb/yd³, except for Sample 256, which contained 1,346 lb/yd³ sand; cement was present in an amount of 452 lb/yd³, except for Sample 256, which contained 517 lb/yd³ cement; #8 coarse aggregate was present in an amount of 861 lb/yd³, except for Sample 256, which contained 851 lb/yd³ #8 coarse aggregate; #57 coarse aggregate was present in an amount of 1,052 lb/yd³, except for Sample 256, which contained 1,040 lb/yd³ #57 coarse aggregate; and water was present in an amount of 264 lb/yd³, except for Sample 256, which contained 290 lb/yd³ water. The water to cementitious material proportion of all the samples was 0.585, except for Sample 256, which had a ratio of 0.56. Table 23B provides the percentage of each of the following admixture ingredients, based on the total dry weight of the admixture: CSH, TIPA, TEA, CS and NaSCN.

TABLE 23A

| Sample | 1-day (% increase) | 7-day (% increase) | 28-day (% increase) | Plasticizer (oz/cwt) | Admixture Dosage (oz/cwt) |
|---|---|---|---|---|---|
| 256 | 0 | 0 | 0 | 0 | 0 |
| 257 | 27 | 14 | 17 | 1.00 | 5.50 |
| 258 | 33 | 14 | 11 | 0.50 | 5.50 |
| 259 | 35 | 10 | 8 | 0.25 | 5.50 |
| 260 | 31 | 10 | 7 | 0.75 | 5.50 |
| 261 | 35 | 8 | 9 | 0.50 | 5.50 |
| 262 | 31 | 6 | 8 | 1.00 | 5.50 |
| 263 | 28 | 4 | 7 | 0.75 | 5.50 |

TABLE 23B

| Mix ID | CSH | TIPA | TEA | CS | NaSCN |
|---|---|---|---|---|---|
| 256 | 0 | 0 | 0 | 0 | 0 |
| 257 | 9.32 | 23.31 | 0 | 20.75 | 46.62 |
| 258 | 21.05 | 17.54 | 0 | 26.32 | 35.09 |
| 259 | 8.16 | 10.20 | 10.20 | 30.61 | 40.82 |
| 260 | 8.16 | 0 | 20.41 | 30.61 | 40.82 |
| 261 | 8.70 | 0 | 15.22 | 32.61 | 43.48 |
| 262 | 21.05 | 0 | 17.74 | 26.32 | 35.09 |
| 263 | 22.22 | 0 | 12.96 | 27.78 | 37.04 |

Table 23 shows a significant improvement in early and final compressive strengths of concrete compositions comprising the subject strength enhancing admixture, as compared to a similar concrete composition having no admixture, even considering the higher water-to-cement ratios of Samples 257-263 as compared to Sample 256.

Samples 264-269 were prepared using a concrete composition comprising Victor cement to create concrete compositions with admixture dosages according to Table 24A. In all of the samples, sand was present in an amount of 1,440 lb/yd³, except for Sample 264 which contained 1,346 lb/yd³ sand; cement was present in an amount of 452 lb/yd³, except for Sample 264, which contained 517 lb/yd³ cement; #8 coarse aggregate was present in an amount of 861 lb/yd³, except for Sample 264, which contained 851 lb/yd³ #8 coarse aggregate; #57 coarse aggregate was present in an amount of 1,052 lb/yd³, except for Sample 264, which contained 1,040 lb/yd³ #57 coarse aggregate; and water was present in an amount of 264 lb/yd³, except for Sample 264 which contained 290 lb/yd³ water. The water to cementitious material proportion of all the samples was 0.585, except for Sample 264, which had a ratio of 0.56. Table 24B provides the percentage of each of the following admixture ingredients, based on the total dry weight of the admixture: CSH, TIPA, TEA, CS and NaSCN.

TABLE 24A

| Sample | 1-day (% increase) | 7-day (% increase) | 28-day (% increase) | Super-plasticizer | Admixture Dosage (oz/cwt) |
|---|---|---|---|---|---|
| 264 | 0 | 0 | 0 | 0 | 0 |
| 265 | 16 | 5 | 9 | 0.50 | 5.50 |
| 266 | 19 | 3 | 7 | 0.50 | 5.50 |
| 267 | 35 | 5 | 11 | 0 | 5.50 |
| 268 | 35 | 0 | 2 | 0.50 | 5.50 |
| 269 | 35 | 6 | 0 | 0 | 5.50 |

TABLE 24B

| Sample | CSH | TIPA | TEA | CS | NaSCN |
|---|---|---|---|---|---|
| 264 | 0 | 0 | 0 | 0 | 0 |
| 265 | 9.32 | 23.31 | 0 | 20.75 | 46.62 |
| 266 | 21.05 | 17.54 | 0 | 26.32 | 35.09 |
| 267 | 8.16 | 10.20 | 10.20 | 30.61 | 40.82 |
| 268 | 8.16 | 0 | 20.41 | 30.61 | 40.82 |
| 269 | 8.70 | 0 | 15.22 | 32.61 | 43.48 |

Table 24 shows a significant improvement in early and final compressive strengths of concrete compositions comprising the subject strength enhancing admixture, as compared to a similar concrete composition having no admixture, even considering the higher water-to-cement ratios of Samples 265-269 as compared to Sample 264.

Samples 270-273 were prepared using a concrete composition comprising Victor cement to create concrete compositions with admixture dosages according to Table 25A. All the samples contained cement, aggregate, sand and water. In all of the samples, sand was present in an amount of 1,433 lb/yd³, except for Sample 270, which contained 1,346 lb/yd³ sand; cement was present in an amount of 450 lb/yd³, except for Sample 270 which contained 517 lb/yd³ cement; #8 coarse aggregate was present in an amount of 861 lb/yd³, except for Sample 270, which contained 851 lb/yd³ #8 coarse aggregate; #57 coarse aggregate was present in an amount of 1,052 lb/yd³, except for Sample 270 which contained 1,040 lb/yd³ #57 coarse aggregate; and water was present in an amount of 268 lb/yd³, except for Sample 270, which contained 290 lb/yd³ water. The water to cementitious material proportion of all the samples was 0.595, except for Sample 270, which had a ratio of 0.56. Table 25B provides the percentage of each of the following admixture ingredients, based on the total dry weight of the admixture: CSH, TIPA, CS and NaSCN.

TABLE 25A

| Sample | 1-day (% increase) | 7-day (% increase) | 28-day (% increase) | Super-plasticizer | Admixture Dosage (oz/cwt) |
|---|---|---|---|---|---|
| 270 | 0 | 0 | 0 | 0 | 0 |
| 271 | 2 | 6 | 13 | 0 | 6.00 |
| 272 | 0 | 6 | 13 | 0 | 6.00 |
| 273 | −2 | 1 | 7 | 0 | 6.00 |

TABLE 25B

| Sample | CSH | TIPA | CS | NaSCN |
|---|---|---|---|---|
| 270 | 0 | 0 | 0 | 0 |
| 271 | 7.27 | 27.27 | 18.18 | 47.27 |
| 272 | 7.42 | 27.83 | 16.50 | 48.24 |
| 273 | 9.63 | 24.08 | 18.14 | 48.15 |

Table 25 shows a significant improvement in early and final compressive strengths of concrete compositions comprising the subject strength enhancing admixture, as compared to a similar concrete composition having no admixture, even considering the higher water-to-cement ratios of Samples 271-273 as compared to Sample 270.

Samples 274-280 were prepared using a concrete composition comprising Lehigh cement to create concrete compositions with admixture dosages according to Table 26A. All the samples contained cement, aggregate, sand and water. In all of the samples, sand was present in an amount of 1,433 lb/yd$^3$, except for Samples 274 and 278, which contained 1,346 lb/yd$^3$ sand; cement was present in an amount of 450 lb/yd$^3$, except for Samples 274 and 278, which contained 517 lb/yd$^3$ cement; #8 coarse aggregate was present in an amount of 861 lb/yd$^3$, except for Samples 274 and 278, which contained 851 lb/yd$^3$ #8 coarse aggregate; #57 coarse aggregate was present in an amount of 1,052 lb/yd$^3$, except for Samples 274 and 278, which contained 1,040 lb/yd$^3$ #57 coarse aggregate; and water was present in an amount of 268 lb/yd$^3$, except for Samples 274 and 278, which contained 290 lb/yd$^3$ water. The water to cementitious material proportion of all the samples was 0.595, except for Samples 274 and 278, which had ratios of 0.56. Table 26B provides the percentage of each of the following admixture ingredients, based on the total dry weight of the admixture: CSH, TIPA, CS, NaSCN and Ca(NO$_3$)$_2$.

TABLE 26A

| Sample | 1-day (% increase) | 7-day (% increase) | 28-day (% increase) | Super-plasticizer | Admixture Dosage (oz/cwt) |
|---|---|---|---|---|---|
| 274 | 0 | 0 | 0 | 0 | 0 |
| 275 | 2 | 9 | 7 | 0 | 6.00 |
| 276 | 0 | 8 | 8 | 0 | 6.00 |
| 277 | -2 | 6 | 9 | 0 | 6.00 |
| 278 | 0 | 0 | 0 | 0 | 0 |
| 279 | -3 | 13 | 12 | 1.00 | 6.00 |
| 280 | -4 | 11 | 17 | 1.00 | 6.00 |

TABLE 26B

| TABLE | CSH | TIPA | CS | NaSCN | Ca(NO$_3$)$_2$ |
|---|---|---|---|---|---|
| 274 | 0 | 0 | 0 | 0 | 0 |
| 275 | 7.27 | 27.27 | 18.18 | 47.27 | 0 |
| 276 | 7.42 | 27.83 | 16.50 | 48.24 | 0 |
| 277 | 9.63 | 24.08 | 18.14 | 48.15 | 0 |
| 278 | 0 | 0 | 0 | 0 | 0 |
| 279 | 9.09 | 22.73 | 11.35 | 45.47 | 11.35 |
| 280 | 7.85 | 19.61 | 9.79 | 0 | 62.75 |

Table 26 shows a significant improvement in early and final compressive strengths of concrete compositions comprising the subject strength enhancing admixture, as compared to a similar concrete composition having no admixture, even considering the higher water-to-cement ratios of Samples 275-277 and 279-280 as compared to Samples 274 and 278.

Samples 281-283 were prepared using a blended concrete composition comprising Victor cement and fly ash to create concrete compositions with admixture dosages according to Table 27A. In all of the samples, sand was present in an amount of 1,450 lb/yd$^3$, except for Sample 281, which contained 1,323 lb/yd$^3$ sand; cement was present in an amount of 371 lb/yd$^3$, except for Sample 281 which contained 440 lb/yd$^3$ cement; fly ash was present in an amount of 66 lb/yd$^3$, except for Sample 281 which contained 77 lb/yd$^3$ fly ash; #8 coarse aggregate was present in an amount of 861 lb/yd$^3$, except for Sample 281 which contained 851 lb/yd$^3$ #8 coarse aggregate; #57 coarse aggregate was present in an amount of 1,052 lb/yd$^3$, except for Sample 281, which contained 1,040 lb/yd$^3$ #57 coarse aggregate; and water was present in an amount of 260 lb/yd$^3$, except for Sample 281, which contained 290 lb/yd$^3$ water. The water to cementitious material proportion of all the samples was 0.595, except for Sample 281, which had a ratio of 0.56. Table 27B provides the percentage of each of the following admixture ingredients, based on the total dry weight of the admixture: CSH, TIPA, CS and NaSCN.

TABLE 27A

| Sample | 1-day (% increase) | 7-day (% increase) | 28-day (% increase) | Admixture Dosage (oz/cwt) |
|---|---|---|---|---|
| 281 | 0 | 0 | 0 | 0 |
| 282 | 10 | 10 | 13 | 7.00 |
| 283 | 9 | 5 | 13 | 7.00 |

TABLE 27B

| Sample | CSH | TIPA | CS | NaSCN |
|---|---|---|---|---|
| 281 | 0 | 0 | 0 | 0 |
| 282 | 7.27 | 27.27 | 18.18 | 47.27 |
| 283 | 7.42 | 27.83 | 16.50 | 48.24 |

Table 27 shows a significant improvement in early and final compressive strengths of blended concrete compositions comprising the subject strength enhancing admixture, as compared to a similar concrete composition having no admixture, even considering the higher water-to-cement ratios of Samples 282-283 as compared to Sample 281.

Samples 284-287 were prepared using a blended concrete composition comprising Lehigh cement and fly ash to create concrete compositions with admixture dosages according to Table 28A. In all of the samples, sand was present in an amount of 1450 lb/yd$^3$, except for Sample 284, which contained 1,323 lb/yd$^3$ sand; cement was present in an amount of 371 lb/yd$^3$, except for Samples 284 and 287, which contained 440 and 365 lb/yd$^3$ cement, respectively; fly ash was present in an amount of 66 lb/yd$^3$, except for Samples 284 and 287, which contained 77 and 64 lb/yd$^3$ fly ash, respectively; #8 coarse aggregate was present in an amount of 861 lb/yd$^3$, except for Sample 284, which contained 851 lb/yd$^3$ #8 coarse aggregate; #57 coarse aggregate was present in an amount of 1,052 lb/yd$^3$, except for Sample 284, which contained 1,040 lb/yd$^3$ #57 coarse aggregate; and water was present in an amount of 371 lb/yd$^3$, except for Samples 284 and 287, which contained 290 and 365 lb/yd$^3$ water, respectively. The water to cementitious material proportion of all the samples was 0.595, except for Sample 284, which had a ratio of 0.56. Table 28B provides the percentage of each of the following admixture ingredients, based on the total dry weight of the admixture: CSH, TIPA, CS and NaSCN.

TABLE 28A

| Sample | 1-day (% increase) | 7-day (% increase) | 28-day (% increase) | Admixture Dosage (oz/cwt) |
|---|---|---|---|---|
| 284 | 0 | 0 | 0 | 0 |
| 285 | 14 | 13 | 11 | 7.00 |
| 286 | 11 | 16 | 13 | 7.00 |
| 287 | 24 | 3 | 9 | 10.00 |

TABLE 28B

| Sample | CSH | TIPA | CS | NaSCN |
|---|---|---|---|---|
| 284 | 0 | 0 | 0 | 0 |
| 285 | 7.27 | 27.27 | 18.18 | 47.27 |
| 286 | 7.42 | 27.83 | 16.50 | 48.24 |
| 287 | 7.42 | 27.83 | 16.50 | 48.24 |

Table 28 shows a significant improvement in early and final compressive strengths of blended concrete compositions comprising the subject strength enhancing admixture, as compared to a similar concrete composition having no admixture, even considering the higher water-to-cement ratios of Samples 285-287 as compared to Sample 284.

Samples 288-293 were prepared using a concrete composition comprising Hercules cement to create concrete compositions with admixture dosages according to Table 29A.

All the samples contained cement, aggregate, sand and water. In all of the samples, sand was present in an amount of 1,431 lb/yd³, except for Sample 288, which contained 1,238 lb/yd³ sand; cement was present in an amount of 450 lb/yd³, except for Samples 288 and 293, which contained 564 and 435 lb/yd³ cement, respectively; #8 coarse aggregate was present in an amount of 861 lb/yd³, except for Samples 288 and 293, which contained 851 lb/yd³ #8 coarse aggregate; #57 coarse aggregate was present in an amount of 1052 lb/yd³, except for Sample 288, which contained 1,040 lb/yd³ #57 coarse aggregate; and water was present in an amount of 268 lb/yd³, except for Samples 288 and 293, which contained 316 and 265 lb/yd³ water, respectively. The water to cementitious material proportion of all the samples was 0.595, except for Samples 288 and 293, which had ratios of 0.56 and 0.610, respectively. Table 29B provides the percentage of each of the following admixture ingredients, based on the total dry weight of the admixture: CSH, TIPA, CS, NaSCN and Ca(NO₃)₂.

TABLE 29A

| Sample | 1-day (% increase) | 7-day (% increase) | 28-day (% increase) | Super-plasticizer | Admixture Dosage (oz/cwt) |
|---|---|---|---|---|---|
| 288 | 0 | 0 | 0 | 0 | 0 |
| 289 | 17 | −1 | 17 | 2.00 | 6.00 |
| 290 | 14 | 2 | 14 | 1.50 | 6.00 |
| 291 | 19 | 3 | 19 | 1.50 | 6.00 |
| 292 | 19 | 5 | 19 | 1.50 | 6.80 |
| 293 | 10 | 4 | 10 | 2.00 | 10.00 |

TABLE 29B

| Sample | CSH | TIPA | CS | NaSCN | Ca(NO₃)₂ |
|---|---|---|---|---|---|
| 288 | 0 | 0 | 0 | 0 | 0 |
| 289 | 7.27 | 27.27 | 18.18 | 47.27 | 0 |
| 290 | 7.42 | 27.83 | 16.50 | 48.24 | 0 |
| 291 | 7.84 | 19.61 | 9.80 | 0 | 62.75 |
| 292 | 7.84 | 19.61 | 9.80 | 0 | 62.75 |
| 293 | 7.84 | 19.61 | 9.80 | 0 | 62.75 |

Table 29 shows a significant improvement in early and final compressive strengths of concrete compositions comprising the subject strength enhancing admixture, as compared to a similar concrete composition having no admixture, even considering the higher water-to-cement ratios of Samples 289-293 as compared to Sample 288.

Samples 294-296 were prepared using a blended concrete composition comprising Hercules cement and fly ash to create concrete compositions with admixture dosages according to Table 30A. Sample 294 contained 440 lb/yd³ cement, 77 lb/yd³ fly ash, 1,040 lb/yd³ #57 aggregate, 851 lb/yd³ #8 aggregate, 1,323 lb/yd³ sand, and 290 lb/yd³ water. Sample 295 contained 365 lb/yd³ cement, 64 lb/yd³ fly ash, 1,052 lb/yd³ #57 aggregate, 861 lb/yd³ #8 aggregate, 1,445 lb/yd³ sand, and 262 lb/yd³ water. Sample 296 contained 371 lb/yd³ cement, 66 lb/yd³ fly ash, 1,052 lb/yd³ #57 aggregate, 861 lb/yd³ #8 aggregate, 1,450 lb/yd³ sand, and 258 lb/yd³ water. Table 30B provides the percentage of each of the following admixture ingredients, based on the total dry weight of the admixture: CSH, TIPA, CS and NaSCN.

TABLE 30A

| Sample | 1-day (% increase) | 7-day (% increase) | 28-day (% increase) | Admixture Dosage (oz/cwt) |
|---|---|---|---|---|
| 294 | 0 | 0 | 0 | 0 |
| 295 | 5 | 1 | −2 | 10.00 |
| 296 | 11 | 5 | 1 | 7.95 |

TABLE 30B

| Sample | CSH | TIPA | CS | NaSCN |
|---|---|---|---|---|
| 294 | 0 | 0 | 0 | 0 |
| 295 | 7.84 | 19.61 | 9.80 | 62.75 |
| 296 | 7.84 | 19.61 | 9.80 | 62.75 |

Table 30 shows a significant improvement in early and final compressive strengths of blended concrete compositions comprising the subject strength enhancing admixture, as compared to a similar concrete composition having no admixture.

Samples 297-299 were prepared using a concrete composition comprising Lehigh cement to create concrete compositions with admixture dosages according to Table 31A. Sample 297 contained 517 lb/yd³ cement, 1,040 lb/yd³ #57 aggregate, 851 lb/yd³ #8 aggregate, 1,192 lb/yd³ sand, and 290 lb/yd³ water. Sample 298 contained 440 lb/yd³ cement, 1,052 lb/yd³ #57 aggregate, 861 lb/yd³ #8 aggregate, 1,308 lb/yd³ sand, and 260 lb/yd³ water. Sample 299 contained 425 lb/yd³ cement, 1,052 lb/yd³ #57 aggregate, 861 lb/yd³ #8 aggregate, 1,318 lb/yd³ sand, and 259 lb/yd³ water. Table 31B provides the percentage of each of the following admixture ingredients, based on the total dry weight of the admixture: CSH, TIPA, CS and NaSCN.

TABLE 31A

| Sample | 1-day (% increase) | 7-day (% increase) | 28-day (% increase) | Admixture Dosage (oz/cwt) |
|---|---|---|---|---|
| 297 | 0 | 0 | 0 | 0 |
| 298 | 15 | 14 | 17 | 6.00 |
| 299 | 7 | 11 | 14 | 10.00 |

TABLE 31B

| Sample | CSH | TIPA | CS | NaSCN |
|---|---|---|---|---|
| 267 | 0 | 0 | 0 | 0 |
| 268 | 7.42 | 27.83 | 16.50 | 48.24 |
| 269 | 7.42 | 27.83 | 16.50 | 48.24 |

Table 31 shows a significant improvement in early and final compressive strengths of concrete compositions comprising the subject strength enhancing admixture, as compared to a similar concrete composition having no admixture.

The results of the experimentation performed on the Samples listed above shows that the use of an admixture comprising calcium silicate hydrate and at least one of: i) at least one alkanolamine; ii) at least one inorganic accelerator; or iii) at least one carbohydrate provides improved results as compared to cementitious compositions with no admixture, or admixtures comprising calcium silicate hydrate alone.

While the strength enhancing admixture, cementitious compositions comprising the strength enhancing admixture, methods of preparing the strength enhancing admixture and methods for improving early and late strength of a cementitious composition have been described in connection with various embodiments, it is to be understood that other similar embodiments may be used or modifications and additions may be made to the described embodiments for performing the same function.

It will be understood that the embodiments described herein are merely illustrative, and that one skilled in the art may make variations and modifications without departing from the spirit and scope of the invention. Further, all embodiments disclosed are not necessarily in the alternative, as various embodiments may be combined to provide the desired result.

What is claimed is:

1. A strength enhancing admixture for cementitious and/or pozzolanic compositions comprising, based on the total dry weight of the admixture, without exceeding 100% by weight of the dry admixture, calcium silicate hydrate in an amount of from 1 to about 80 weight percent, and: i) at least one alkanolamine in an amount of from 7.5 to about 55 weight percent; ii) at least one inorganic accelerator in an amount of 7.5 to about 85 weight percent, wherein the at least one inorganic accelerator is selected from a nitrate-based compound, a thiocyanate-based compound and mixtures thereof; and iii) at least one carbohydrate in an amount of from 2.5 to about 50 weight percent; wherein the calcium silicate hydrate comprises a product of a reaction of a water-soluble calcium compound with a water-soluble silicate compound in presence of a water-soluble dispersant; and wherein the at least one inorganic accelerator comprises any inorganic accelerator(s) other than calcium silicate hydrate.

2. The strength enhancing admixture of claim 1, wherein the water-soluble dispersant comprises at least one of a polycarboxylate ether or a polyaryl ether.

3. The strength enhancing admixture of claim 1, wherein the water-soluble dispersant comprises a polycarboxylate ether.

4. The strength enhancing admixture of claim 1, wherein the at least one alkanolamine comprises at least one of triisopropanolamine, triethanolamine, N,N,N',N'-tetra(hydroxyethyl)ethylenediamine, monoethanolamine, methydiethanolamine, diethanolamine or diisopropanolamine.

5. The strength enhancing admixture of claim 1, wherein the at least one inorganic accelerator comprises a further inorganic accelerator selected from the group consisting of at least one thiocyanate-based compound, sulfate-based compound, aluminate-based compound, nitrite-based compound, colloidal silica and mixtures thereof.

6. The strength enhancing admixture of claim 5, wherein the sulfate-based compound comprises at least one of aluminum sulfate, aluminum hydroxy sulfate, calcium thiosulfate, sodium thiosulfate, potassium sulfate, calcium sulfate, calcium sulfate hemihydrate, calcium sulfate hemihydrate dehydrate or sodium sulfate.

7. The strength enhancing admixture of claim 5, wherein the aluminate-based compound comprises sodium aluminate.

8. The strength enhancing admixture of claim 5, wherein the nitrate-based compound is a nitrate salt of an alkali metal, alkaline earth metal, or aluminum.

9. The strength enhancing admixture of claim 5, wherein the nitrite-based compound is a nitrite salt of an alkali metal, alkaline earth metal, or aluminum.

10. The strength enhancing admixture of claim 1, wherein the at least one carbohydrate comprises at least one of sugar-containing substances, corn syrup, diutan gum, welan gum, molasses, or sucrose.

11. The strength enhancing admixture of claim 1, further comprising a defoamer.

12. The strength enhancing admixture of claim 1, further comprising at least one of set retarders, air detraining agents, air entraining agents, shrinkage reducing admixtures, water reducers, foaming agents, dampproofing admixtures, pumping aids, fungicidal admixtures, insecticidal admixtures, germicidal admixtures, alkali activity reducers, bonding admixtures, corrosion inhibitors or pigments.

13. A cementitious composition comprising at least one cementitious and/or pozzolanic material and a strength enhancing admixture according to claim 1.

14. The cementitious composition of claim 13, wherein the at least one cementitious and/or pozzolanic material comprises at least one of hydraulic cement, fly ash, limestone, slag, calcined clay, silica fume or metakaolin.

15. A method for improving early and/or late compressive strength of a cementitious composition comprising introducing into a cementitious and/or pozzolanic mixture a strength enhancing admixture according to claim 1.

16. A method of preparing a cementitious composition comprising forming a mixture of water, at least one cementitious and/or pozzolanic material and a strength enhancing admixture according to claim 1.

* * * * *